US012755611B2

(12) United States Patent
Joung

(10) Patent No.: US 12,755,611 B2
(45) Date of Patent: Oct. 6, 2026

(54) WAGER-BASED GAME HAVING A MYSTERY BET OPTION PROVIDED BY A GAMING MACHINE

(71) Applicant: AGS LLC, Las Vegas, NV (US)

(72) Inventor: Heather Anne Joung, North Rocks (AU)

(73) Assignee: AGS LLC, Las Vegas, NV (US)

( * ) Notice: Subject to any disclaimer, the term of this patent is extended or adjusted under 35 U.S.C. 154(b) by 597 days.

(21) Appl. No.: 18/063,889

(22) Filed: Dec. 9, 2022

(65) Prior Publication Data

US 2024/0194031 A1 Jun. 13, 2024

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |
| ***G07F 17/34*** | (2006.01) |

(52) U.S. Cl.

CPC ...... *G07F 17/3288* (2013.01); *G07F 17/3211* (2013.01); *G07F 17/34* (2013.01)

(58) Field of Classification Search

CPC ... G07F 17/32; G07F 17/3214; G07F 17/3222
USPC .......................... 463/1, 9, 10, 20, 22, 25, 30
See application file for complete search history.

(56) References Cited

U.S. PATENT DOCUMENTS

| | | | | |
|---|---|---|---|---|
| 11,158,166 B2 * | 10/2021 | Hawkins | ............. | G07F 17/3288 |
| 2013/0084940 A1 * | 4/2013 | Lee | ......................... | G07F 17/34 463/16 |
| 2015/0111632 A1 * | 4/2015 | Meyer | ................. | G07F 17/3267 463/20 |
| 2021/0166529 A1 * | 6/2021 | Sanborn | .............. | G07F 17/3262 |
| 2021/0225128 A1 * | 7/2021 | Marks | ..................... | G07F 17/34 |

* cited by examiner

*Primary Examiner* — Adetokunbo O Torimiro

(74) *Attorney, Agent, or Firm* — Endurance Law Group PLC; James R. Yee

(57) ABSTRACT

A wager-based game provides a plurality of bet options including a plurality of bet level options having an associated wager and a mystery bet option. A bet level and a wager amount as a function of the selected wager option. The bet level is randomly established if the mystery bet option is selected by the player. The player may be provided an award based on the outcome of the base game, the bet level and a paytable.

21 Claims, 27 Drawing Sheets

FIG. 1E-1

| Reel 1 | Reel 2 | Reel 3 | Reel 4 | Reel 5 |
|---|---|---|---|---|
| H2 | H2 | H4 | H4 | H1 |
| H2 | H2 | H4 | H4 | H1 |
| H2 | H2 | H4 | H4 | L1 |
| L2 | L2 | L1 | L1 | L2 |
| L3 | H4 | PRIZE | H2 | H3 |
| BN | H4 | L2 | H2 | H3 |
| L4 | L1 | H1 | L3 | H3 |
| L1 | PRIZE | H1 | H4 | L4 |
| H2 | L3 | L4 | L1 | H2 |
| H2 | H2 | PRIZE | PRIZE | H2 |
| H2 | H2 | L3 | L2 | L4 |
| L4 | H2 | H3 | H1 | PRIZE |
| PRIZE | L2 | H3 | H1 | L3 |
| L3 | WW | L1 | H1 | H3 |
| H3 | WW | WW | L3 | H3 |
| H3 | WW | WW | WW | H3 |
| H3 | L2 | WW | WW | L4 |
| L4 | H3 | L1 | WW | H3 |
| BN | H3 | L2 | L2 | H3 |
| L1 | H3 | PRIZE | H2 | H3 |
| H1 | L3 | L4 | H2 | L1 |
| H1 | BN | H1 | L3 | H2 |
| L4 | L4 | H1 | H3 | H2 |
| PRIZE | H4 | H1 | L1 | H2 |
| L3 | L1 | L1 | PRIZE | L2 |
| H3 | PRIZE | WW | L2 | PRIZE |
| H3 | L4 | WW | H4 | L3 |
| H3 | H2 | WW | H4 | H4 |
| L1 | H2 | L3 | H4 | H4 |
| H4 | L2 | H3 | H3 | H4 |
| H4 | PRIZE | H3 | H3 | H4 |
| H4 | L4 | L2 | H3 | H4 |
| L4 | H1 | H1 | L2 | L3 |
| PRIZE | H1 | H1 | PRIZE | PRIZE |
| L1 | L2 | L1 | L3 | L1 |
| H1 | WW | PRIZE | H3 | H1 |
| H1 | WW | L2 | H3 | H1 |
| L4 | WW | H2 | L2 | H1 |
| H3 | L1 | H2 | H1 | H1 |
| H3 | H2 | L1 | H1 | H1 |
| L2 | H2 | H1 | L1 | H1 |
| L4 | H2 | H1 | PRIZE | L1 |
| BN | L2 | L4 | L2 | H3 |
| L1 | PRIZE | WW | H1 | H3 |
| L3 | L3 | WW | H1 | L4 |
| H1 | H1 | WW | L1 | BN |
| H1 | L1 | L3 | H3 | L1 |
| L4 | H3 | H2 | H3 | H1 |
| PRIZE | H3 | H2 | H3 | H1 |
| L1 | H3 | H2 | L3 | L4 |
| H3 | L4 | L2 | BN | PRIZE |
| H3 | WW | BN | L2 | L2 |
| L2 | WW | L1 | WW | H4 |
| PRIZE | WW | H1 | WW | H4 |

42

44

40

FIG. 1E-2

| | | | | |
|---|---|---|---|---|
| L3 | L3 | H1 | WW | H4 |
| H1 | H1 | H1 | L1 | H4 |
| H1 | H1 | L1 | H3 | L1 |
| L2 | L2 | PRIZE | H3 | PRIZE |
| BN | BN | L4 | L3 | L2 |
| L4 | L4 | WW | PRIZE | H2 |
| H2 | H2 | WW | L1 | H2 |
| H2 | H2 | WW | H4 | H2 |
| H2 | L3 | L1 | H4 | H2 |
| L2 | PRIZE | BN | L2 | L1 |
| H4 | L1 | L3 | WW | H2 |
| H4 | H1 | H2 | WW | H2 |
| H4 | L3 | H2 | WW | H2 |
| L1 | WW | H1 | L3 | H2 |
| PRIZE | WW | H1 | H2 | H2 |
| L3 | WW | H1 | H2 | H2 |
| H3 | L4 | L3 | L2 | L2 |
| L4 | H4 | PRIZE | PRIZE | H1 |
| H1 | H4 | L4 | L4 | H1 |
| H1 | L1 | H1 | H1 | L4 |
| H1 | PRIZE | H1 | H1 | PRIZE |
| L2 | L2 | H2 | L2 | L1 |
| H2 | BN | H2 | H3 | H4 |
| H2 | L1 | L4 | H3 | H4 |
| L4 | WW | PRIZE | L4 | H4 |
| H4 | WW | L3 | PRIZE | H4 |
| H4 | WW | H1 | L1 | L4 |
| H4 | L2 | H1 | WW | BN |
| L1 | PRIZE | L2 | WW | L1 |
| PRIZE | L1 | WW | WW | H3 |
| L4 | H4 | WW | L2 | H3 |
| H1 | H4 | WW | BN | H3 |
| H1 | L2 | L4 | L4 | L2 |
| H1 | H4 | H2 | H3 | PRIZE |
| L3 | H4 | H2 | H3 | L3 |
| H2 | L4 | H2 | H3 | H2 |
| H2 | H2 | L1 | L3 | H2 |
| L4 | | PRIZE | | L1 |
| PRIZE | | L2 | | H3 |
| L3 | | H1 | | H3 |
| H4 | | H1 | | L4 |
| H4 | | L3 | | PRIZE |
| H4 | | BN | | L2 |
| L1 | | L1 | | H2 |
| H1 | | H1 | | H2 |
| L4 | | H1 | | L1 |
| PRIZE | | L3 | | PRIZE |
| L1 | | | | L4 |
| H2 | | | | H3 |
| H2 | | | | H3 |
| H2 | | | | H3 |
| L1 | | | | L1 |
| H1 | | | | H2 |
| H1 | | | | H2 |
| L4 | | | | L2 |

42

44

40

FIG. 1F-1

| Reel 1 | Reel 2 | Reel 3 | Reel 4 | Reel 5 |
|---|---|---|---|---|
| H2 | H2 | H4 | H4 | H1 |
| H2 | H2 | H4 | H4 | H1 |
| PRIZE | H2 | H4 | H4 | L1 |
| L2 | L2 | L1 | L1 | L2 |
| L3 | H4 | PRIZE | H2 | PRIZE |
| BN | H4 | L2 | H2 | H3 |
| L4 | L1 | H1 | L3 | H3 |
| L1 | PRIZE | H1 | H4 | L4 |
| H2 | L3 | L4 | L1 | H2 |
| H2 | H2 | PRIZE | PRIZE | H2 |
| H2 | H2 | L3 | L2 | L4 |
| L4 | H2 | H3 | H1 | PRIZE |
| PRIZE | L2 | H3 | H1 | L3 |
| L3 | WW | L1 | H1 | H3 |
| H3 | WW | WW | L3 | H3 |
| H3 | WW | WW | WW | PRIZE |
| H3 | L2 | WW | WW | L4 |
| L4 | H3 | L1 | WW | H3 |
| BN | H3 | L2 | L2 | H3 |
| L1 | H3 | PRIZE | H2 | H3 |
| H1 | L3 | L4 | H2 | L1 |
| H1 | BN | H1 | L3 | PRIZE |
| L4 | L4 | H1 | H3 | H2 |
| PRIZE | H4 | H1 | L1 | H2 |
| L3 | L1 | L1 | PRIZE | L2 |
| H3 | PRIZE | WW | L2 | PRIZE |
| H3 | L4 | WW | H4 | L3 |
| H3 | H2 | WW | H4 | H4 |
| L1 | H2 | L3 | H4 | H4 |
| PRIZE | L2 | H3 | H3 | H4 |
| H4 | PRIZE | PRIZE | H3 | H4 |
| H4 | L4 | L2 | H3 | H4 |
| L4 | H1 | H1 | L2 | L3 |
| PRIZE | H1 | H1 | PRIZE | PRIZE |
| L1 | L2 | L1 | L3 | L1 |
| H1 | WW | PRIZE | H3 | H1 |
| H1 | WW | L2 | H3 | H1 |
| L4 | WW | H2 | L2 | H1 |
| PRIZE | L1 | H2 | H1 | H1 |
| H3 | H2 | L1 | H1 | H1 |
| L2 | H2 | H1 | L1 | H1 |
| L4 | H2 | H1 | PRIZE | L1 |
| BN | L2 | L4 | L2 | PRIZE |
| L1 | PRIZE | WW | H1 | H3 |
| L3 | L3 | WW | H1 | L4 |
| H1 | H1 | WW | L1 | BN |
| H1 | L1 | L3 | H3 | L1 |
| L4 | H3 | H2 | H3 | H1 |
| PRIZE | H3 | H2 | H3 | H1 |
| L1 | H3 | H2 | L3 | L4 |
| H3 | L4 | L2 | BN | PRIZE |
| H3 | WW | BN | L2 | L2 |
| L2 | WW | L1 | WW | H4 |
| PRIZE | WW | H1 | WW | H4 |

72

FIG. 1F-2

| | | | | |
|---|---|---|---|---|
| L3 | L3 | H1 | WW | H4 |
| H1 | H1 | H1 | L1 | H4 |
| H1 | H1 | L1 | H3 | L1 |
| L2 | L2 | PRIZE | H3 | PRIZE |
| BN | BN | L4 | L3 | L2 |
| L4 | L4 | WW | PRIZE | H2 |
| H2 | H2 | WW | L1 | H2 |
| H2 | H2 | WW | H4 | H2 |
| PRIZE | L3 | L1 | H4 | PRIZE |
| L2 | PRIZE | BN | L2 | L1 |
| H4 | L1 | L3 | WW | H2 |
| H4 | H1 | H2 | WW | H2 |
| H4 | L3 | H2 | WW | H2 |
| L1 | WW | H1 | L3 | H2 |
| PRIZE | WW | H1 | H2 | PRIZE |
| L3 | WW | H1 | H2 | H2 |
| H3 | L4 | L3 | L2 | L2 |
| L4 | H4 | PRIZE | PRIZE | H1 |
| H1 | H4 | L4 | L4 | H1 |
| H1 | L1 | H1 | H1 | L4 |
| H1 | PRIZE | H1 | H1 | PRIZE |
| L2 | L2 | H2 | L2 | L1 |
| PRIZE | BN | H2 | H3 | H4 |
| H2 | L1 | L4 | H3 | H4 |
| L4 | WW | PRIZE | L4 | H4 |
| H4 | WW | L3 | PRIZE | H4 |
| H4 | WW | H1 | L1 | L4 |
| H4 | L2 | H1 | WW | BN |
| L1 | PRIZE | L2 | WW | L1 |
| PRIZE | L1 | WW | WW | H3 |
| L4 | H4 | WW | L2 | H3 |
| H1 | H4 | WW | BN | H3 |
| H1 | L2 | L4 | L4 | L2 |
| PRIZE | PRIZE | H2 | H3 | PRIZE |
| L3 | H4 | H2 | H3 | L3 |
| H2 | L4 | H2 | PRIZE | H2 |
| H2 | H2 | L1 | L3 | H2 |
| L4 | | PRIZE | | L1 |
| PRIZE | | L2 | | H3 |
| L3 | | H1 | | H3 |
| H4 | | H1 | | L4 |
| H4 | | L3 | | PRIZE |
| H4 | | BN | | L2 |
| L1 | | L1 | | H2 |
| H1 | | H1 | | H2 |
| L4 | | H1 | | L1 |
| PRIZE | | L3 | | PRIZE |
| L1 | | | | L4 |
| H2 | | | | H3 |
| H2 | | | | H3 |
| PRIZE | | | | H3 |
| L1 | | | | L1 |
| H1 | | | | PRIZE |
| H1 | | | | H2 |
| L4 | | | | L2 |

72

51

| Pay Table | | | | | | |
|---|---|---|---|---|---|---|
| | | 1 | 2 | 3 | 4 | 5 |
| WW | WW | | | | | |
| H1 | H1 | | | 15 | 25 | 200 |
| H2 | H2 | | | 10 | 20 | 100 |
| H3 | H3 | | | 10 | 20 | 100 |
| H4 | H4 | | | 10 | 20 | 100 |
| L1 | L1 | | | 5 | 8 | 50 |
| L2 | L2 | | | 5 | 8 | 50 |
| L3 | L3 | | | 5 | 8 | 50 |
| L4 | L4 | | | 5 | 8 | 50 |
| BN | BN | | | 80 | 800 | 1600 |
| PRIZE | PRIZE | | | | | |

FIG. 1G

| REELS 1 AND 5 | | | REELS 2 AND 4 | | | REELS 3 | | |
|---|---|---|---|---|---|---|---|---|
| LEVEL | INCREMENT | STAY | LEVEL | INCREMENT | STAY | LEVEL | INCREMENT | STAY |
| 1 | 100% | 0% | 1 | 100% | 0% | 1 | 100% | 0% |
| 2 | 63% | 37% | 2 | 60% | 40% | 2 | 70% | 30% |
| 3 | 25% | 75% | 3 | 35% | 65% | 3 | 50% | 50% |
| | | | 4 | 8% | 92% | 4 | 20% | 80% |
| | | | | | | 5 | 7% | 93% |

FIG. 2C

WAGER-BASED GAME HAVING A MYSTERY BET OPTION PROVIDED BY A GAMING MACHINE

BACKGROUND OF THE INVENTION

Field of the Invention

The invention relates generally to gaming machines for providing wager-based games, and more particularly to a gaming machine that offers players a mystery bet multiplier option.

Background of the Invention

Slot-type electronic and/or mechanical gaming machines, often also referred as slot machines, are popular fixtures in casino or other gaming environments. Such slot machines are generally controlled by installed software programs. Aside from slot machines, various other kinds of gaming devices, including electronically-assisted gaming tables are also generally controlled by installed software programs. Generally, the installed software programs are stored in secured memory devices housed in secured cabinets and executed by secured processors and/or other programmable hardware also housed in the secured cabinets. The displayed outcome of each round of gaming action (e.g., spinning and settling of on-screen virtual reels) often remains relatively static.

Current slot-type gaming machines are based on credits, i.e., wagers are made in terms of one or more credits. The denomination of a gaming machine refers to the value of each credit. For example, a specific gaming machine may have a denomination of 1 cent, 50 cents, $1, $2, $25, or any currency value. Typical gaming machines provide a plurality of bet options to the players. For example, a gaming machine may provide a minimum wager bet option expressed in credits, e.g., 1 credit or 75 credits. Generally, the potential award (or win) is based on the outcome of an instance of the game, a paytable and the player selected wager options. Generally, a game machine may provide additional bet options, i.e., wagers expressed as an increasing number of credits, usually a multiple of the minimum wager. The larger wager or bet option may be referred to "MAX BET" and may provide the player with additional game features including potential bonuses or awards.

After prolonged play, gamers may become bored by monotonous display of the same basic game template (e.g., three displayed rows of five vertical reels and one horizontal payline) repeatedly and/or the standard fixed bet options.

The present invention is aimed at one or more of the problems identified above.

BRIEF SUMMARY OF THE INVENTION

In a first aspect of the present invention, a gaming machine for providing a wager-based game to a player, is provided. The gaming machine includes a cabinet having an interior, a power supply, memory, a display, a control panel, and a gaming machine controller. The power supply is disposed within the interior of the cabinet and receives power from an external power source. The memory stores non-transitory game software used to generate the wager-based game on the gaming machine, a plurality of virtual reel strips, a paytable, and a set of winning paylines associated with the wager-based game. Each virtual strip has a plurality of symbol positions. Each symbol position has an associated symbol from a set of available symbols. The display is mounted in the cabinet and is electrically coupled to, and receives power from, the power supply. The display is configured to display a play grid having a plurality of cells arranged in a plurality of columns. One of the virtual reel strips is associated with one of the columns. The control panel establishes a user interface configured to allow the player to select a wager option from a set of available wager options. The set of available options includes a plurality of bet level options having an associated wager and a mystery bet option. The gaming machine controller includes a processor, is disposed within the interior of the cabinet, and is coupled to the power supply, the display, and the memory. The gaming machine controller controls play of a plurality of instances of the wager-based game. For each instance of the wager-based game, the non-transitory game software controls the processor to establish a bet level and a wager amount as a function of the selected wager option. The bet level is randomly established if the mystery bet option is selected by the user. The non-transitory game software further controls the processor to randomly establish an outcome for the instance of the wager-based game. The outcome includes a stop position associated with each virtual reel strip on the associated column resulting in a game symbol in each cell of the play grid. The non-transitory game software also controls the processor to analyze the outcome of the instance of the wager-based game and provide an award to the player as a function of the outcome, the paytable, the bet level, and the winning paylines.

In a second aspect of the present invention, a computer-based method of operating a gaming machine to providing a wager-based game to a player is provided. The gaming machine includes a cabinet having an interior, a power supply, memory, a display, a control panel, and a gaming machine controller. The power supply is disposed within the interior of the cabinet and receives power from an external power source. The memory stores non-transitory game software used to generate the wager-based game on the gaming machine, a plurality of virtual reel strips, a paytable, and a set of winning paylines associated with the wager-based game. Each virtual strip has a plurality of symbol positions. Each symbol position has an associated symbol from a set of available symbols. The display is mounted in the cabinet and is electrically coupled to, and receives power from, the power supply. The display is configured to display a play grid having a plurality of cells arranged in a plurality of columns. One of the virtual reel strips is associated with one of the columns. The control panel establishes a user interface configured to allow the player to select a wager option from a set of available wager options. The set of available options includes a plurality of bet level options having an associated wager and a mystery bet option. The gaming machine controller includes a processor, is disposed within the interior of the cabinet, and is coupled to the power supply, the display, and the memory. The gaming machine controller controls play of a plurality of instances of the wager-based game. For each instance of the wager-based game, the non-transitory game software controls the processor to establish a bet level and a wager amount as a function of the selected wager option. The bet level is randomly established if the mystery bet option is selected by the user. The non-transitory game software further controls the processor to randomly establish an outcome for the instance of the wager-based game. The outcome includes a stop position associated with each virtual reel strip on the associated column resulting in a game symbol in each cell of the play grid. The non-transitory game software also controls the processor to analyze the outcome of the instance of the wager-based game and provide an award to the player as a function of the outcome, the paytable, the bet level, and the winning paylines.

In a third aspect of the present invention, non-transitory computer-readable storage storing game software used to generate a wager-based game on a gaming machine. The gaming machine includes a cabinet having an interior, a power supply, memory, a display, a control panel, and a gaming machine controller. The power supply is disposed within the interior of the cabinet and receives power from an external power source. The memory stores non-transitory game software used to generate the wager-based game on the gaming machine, a plurality of virtual reel strips, a paytable, and a set of winning paylines associated with the wager-based game. Each virtual strip has a plurality of symbol positions. Each symbol position has an associated symbol from a set of available symbols. The display is mounted in the cabinet and is electrically coupled to, and receives power from, the power supply. The display is configured to display a play grid having a plurality of cells arranged in a plurality of columns. One of the virtual reel strips is associated with one of the columns. The control panel establishes a user interface configured to allow the player to select a wager option from a set of available wager options. The set of available options includes a plurality of bet level options having an associated wager and a mystery bet option. The gaming machine controller includes a processor, is disposed within the interior of the cabinet, and is coupled to the power supply, the display, and the memory. The gaming machine controller controls play of a plurality of instances of the wager-based game. The non-transitory game software controls the processor to present a set of available wager options to the player on the control panel. The set of available options includes a plurality of bet level options having an associated wager and a mystery bet option. The non-transitory game software further controls the processor to allow the player to select a wager option from the set of available wager options and to establish a bet level and a wager amount as a function of the selected wager option. The bet level is randomly established if the mystery bet option is selected by the user. The non-transitory game software also controls the processor to randomly establish an outcome for the instance of the wager-based game. The outcome includes a stop position associated with each virtual reel strip on the associated column resulting in a game symbol in each cell of the play grid. The non-transitory game software also controls the processor to analyze the outcome of the instance of the wager-based game and provide an award to the player as a function of the outcome, the paytable, the bet level, and the winning paylines.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIGS. 1E-1 and 1E-2 are illustrations of exemplary virtual reel strips associated with the base game of FIG. 1C.

FIGS. 1F-1 and 1F-2 are illustrations of exemplary virtual reel strips associated with free spins of the base game of FIG. 1C.

FIG. 1G is an exemplary paytable for use with the base game of FIG. 1A.

FIGS. 11-1M contain exemplary help screens from the Pillars of Cash game.

FIG. 2C is a table of probabilities associated with persistent feature game of FIG. 1A.

DETAILED DESCRIPTION OF THE INVENTION

General Description

Figure 1A:
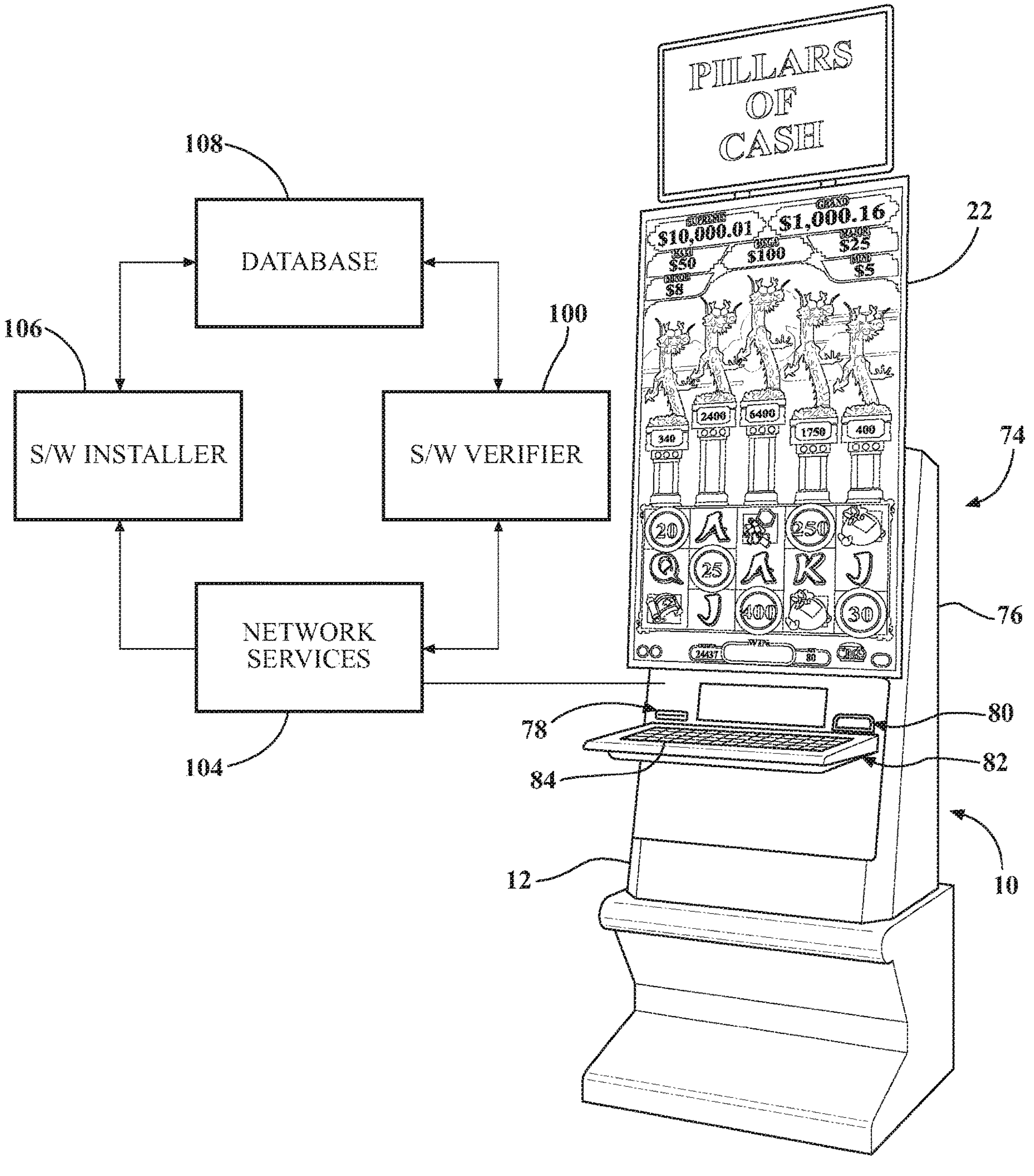
FIG. 1A illustrates a gaming system and environment including a wager-based gaming machine having a base game and a persistent feature game, in accordance with the present disclosure.

Referring to the figures, wherein like numerals indicate like or corresponding parts throughout the several views and as described below, an electronic gaming machine (gaming machine or EGM) 10 provides a wager-based game having a base game and a persistent feature (or feature game), to a player. The base game may provide an award to the player during, and based on, an outcome of base game. Generally, as discussed in further detail believe, the persistent feature counts or accumulates occurrences of a trigger symbol across instances of the base game and provides the player a feature award as a function of the accumulated occurrences of the trigger symbol and predefined conditions. A persistent feature prize may be awarded to the player if the counter is equal to a maximum value. In addition, the wager-based game may provide a number of free spins if predefined conditions are met, i.e., without an additional wager. As is known, the wager-based game may also provide the player an opportunity to win one or more progressive awards.

As will be discussed in further detail below, in the illustrated embodiment the electronic gaming machine 10 provides a video-slot game that provides the player an opportunity to select one of a plurality of available wager or bet options. Each of the plurality of available bet options includes a bet level or multiplier and an associated wager. Typically, the wager is a number of credits. The value of a credit may vary based on the denomination of the EGM 10. For example, in a 1 cent (or penny) denomination game, each credit is worth 1 cent and in a 50-cent denomination game, each credit is worth 50 cents.

In the illustrated embodiment, the plurality of available bet options includes a minimum bet level and one or more multiples of the minimum bet option. In addition, the plurality of available bet options may include a Mystery Bet option or feature (which may be referred to as the "Lucy Up" feature).

As will be explained in more detail below, if the mystery bet option is selected by the player (for an instance of the video slot game), a bet level is randomly determined. For example, the following bet options may be available:

| Bet Level | Wager Amount (Credits) |
|---|---|
| x 1 | 75 |
| x 2 | 150 |
| x 3 | 225 |
| x 5 | 375 |
| x 10 | 750 |
| Mystery Bet (Random bet level) | (1) Wager amount associated with random bet level OR (2) Predetermined Wager Amount |

In one embodiment, the wager amount (or required wager) associated with the randomly determined bet level is the wager amount associated with the randomly determined bet level. For example, if the player selects the mystery bet, a randomly determined bet level is selected from the available bet levels: (×1), (×2), (×3), (×5), (×10) and the wager amount is the associated wager amount. For instance, if the (×3) bet level is randomly selected, then the required wager amount is 225 credits.

In another embodiment, the Mystery Bet has a predetermined wager amount, e.g., 300 credits. Thus, the wager amount is fixed (and known before the Mystery Bet Option is selected) and independent of the randomly selected bet level.

As discussed in more detail below, for each instance of the game, an outcome is determined. An award may be provided to the player based on the outcome of the instance of the game, the selected or randomly determined bet level and a predetermined paytable.

The foregoing invention has been described in accordance with the relevant legal standards, thus the description is exemplary rather than limiting in nature. Variations and modifications to the disclosed embodiment may become apparent to those skilled in the art and fall within the scope of the invention.

Reference will now be made in detail to some specific embodiments in accordance with the present disclosure. While the present disclosure is described in conjunction with these specific embodiments, it will be understood that it is not intended to limit the teachings of the present disclosure to the described embodiments. On the contrary, it is intended to cover alternatives, modifications, and equivalents as may be included within the spirit and scope of the teachings of the present disclosure.

In the following description, numerous specific details are set forth in order to provide a thorough understanding of the present disclosure. Particular embodiments may be implemented without some or all of these specific details. In other instances, well known process operations have not been described in detail in order not to unnecessarily obscure the present disclosure. Although not explicitly shown in many of the diagrams, it is to be understood that the various automated mechanisms discussed herein typically include at least one data processing unit such as a central processing unit (CPU) where multicore and other parallel processing architectures may additionally or alternatively be used. It is to be further understood that the various automated mechanisms typically include or are operatively coupled to different kinds of non-transient storage mechanisms including high speed caches (which could be on-chip, package secured caches), high speed DRAM and/or SRAM, nonvolatile Flash or other such nonvolatile random access and/or sequential access storage devices, magnetic, optical and/or magneto-optical storage devices and so on. The various data processing mechanisms and data storage mechanisms may be operatively intercoupled by way of local buses and/or other communication fabrics where the latter may include wireless as well as wired communication fabrics.

In general, gaming systems which provide wager-based games are described. In particular, with respect to FIGS. 1A and 2A, a gaming machine system 100 including a plurality of automated wager-based gaming machines or EGMs 10 in communication with network devices 102 is described. In different aspects of the present invention, the gaming machine system 10 supports wager-based games including a base or main game, a persistent feature or feature game, a progressively growing prize or award and/or where the unleashing of a whole series of bonuses or other awards is made possible. Although not indicated in FIGS. 1A, 2, one of the mandates of operating a secure gaming system is that direct remote reconfiguration of the gaming machines (EGM's e.g., 10) and their associated in-casino network controllers (e.g., 102) is not permitted at least for certain classes of wager-based games (e.g., Class III games) and/or in certain jurisdictions or certain gaming organizations. Reconfiguration often requires that an authorized human being or operator 106 of FIG. 2A) open a secured housing (e.g., with an allocated mechanical key) and perform the reconfiguration (with aid of an electronic security key and entry of appropriate passwords) while in plain sight on the casino floor so that such activities can be monitored and audited by casino security teams.

Exemplary Gaming Machine 10 and Wager-Based Game

With particular reference to FIGS. 1A-1M, 2B and 3, the electronic gaming machine or EGM 10 may provide a wager-based game to a player 28. In the illustrated embodiment, the wager-based game is shown as "Pillars of Cash", however, this embodiment is exemplary only. As discussed in further detail below, the wager-based game may include a base game and a persistent feature or feature game. The wager-based game may also include a free spin feature, as well as provide the player 28 an opportunity to win or be awarded one or more progressive awards.

Figure 2A:
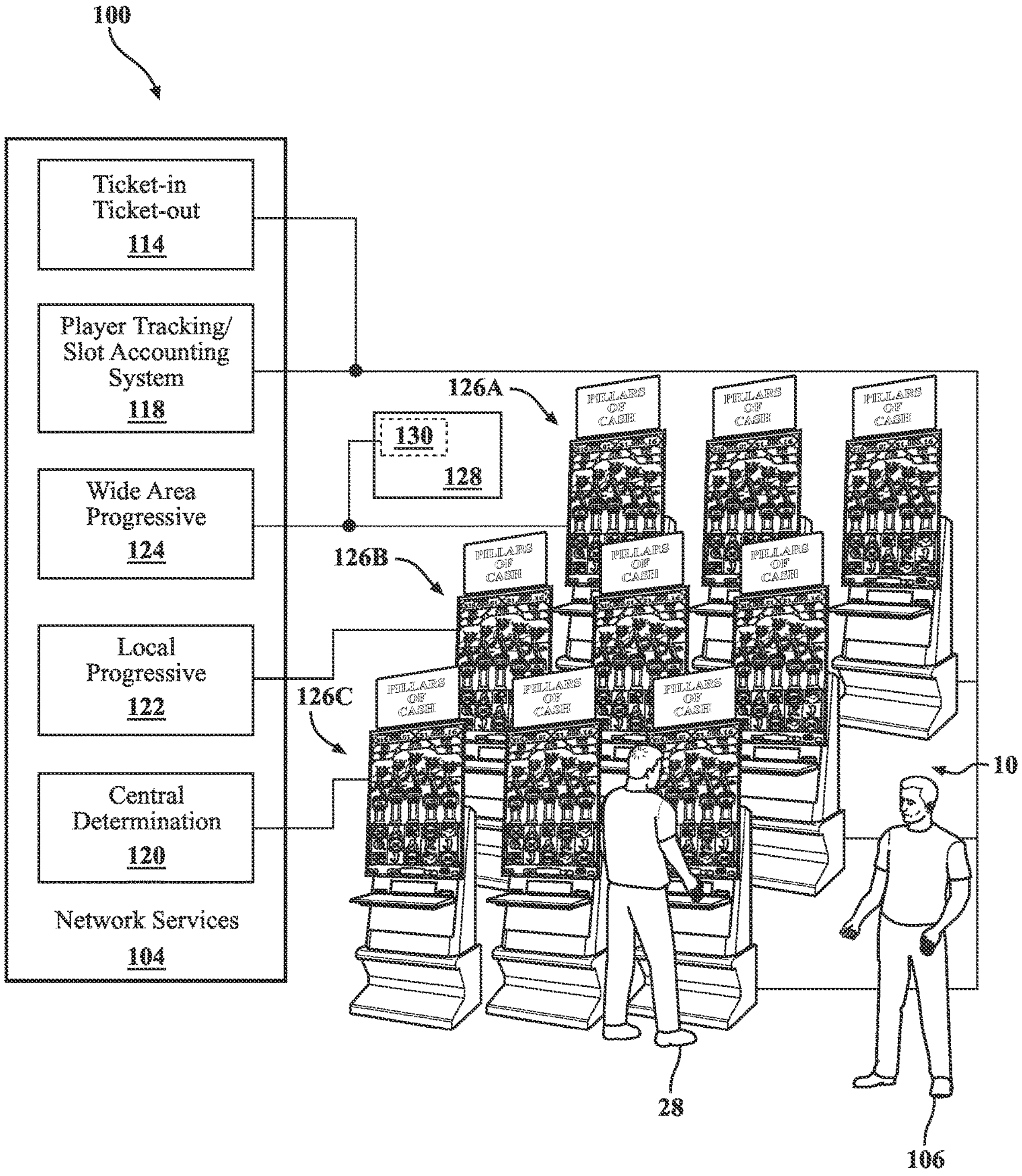
FIG. 2A illustrates a gaming system including three banks of gaming machines that may participate in a progressive jackpot pool.
Figure 2B:
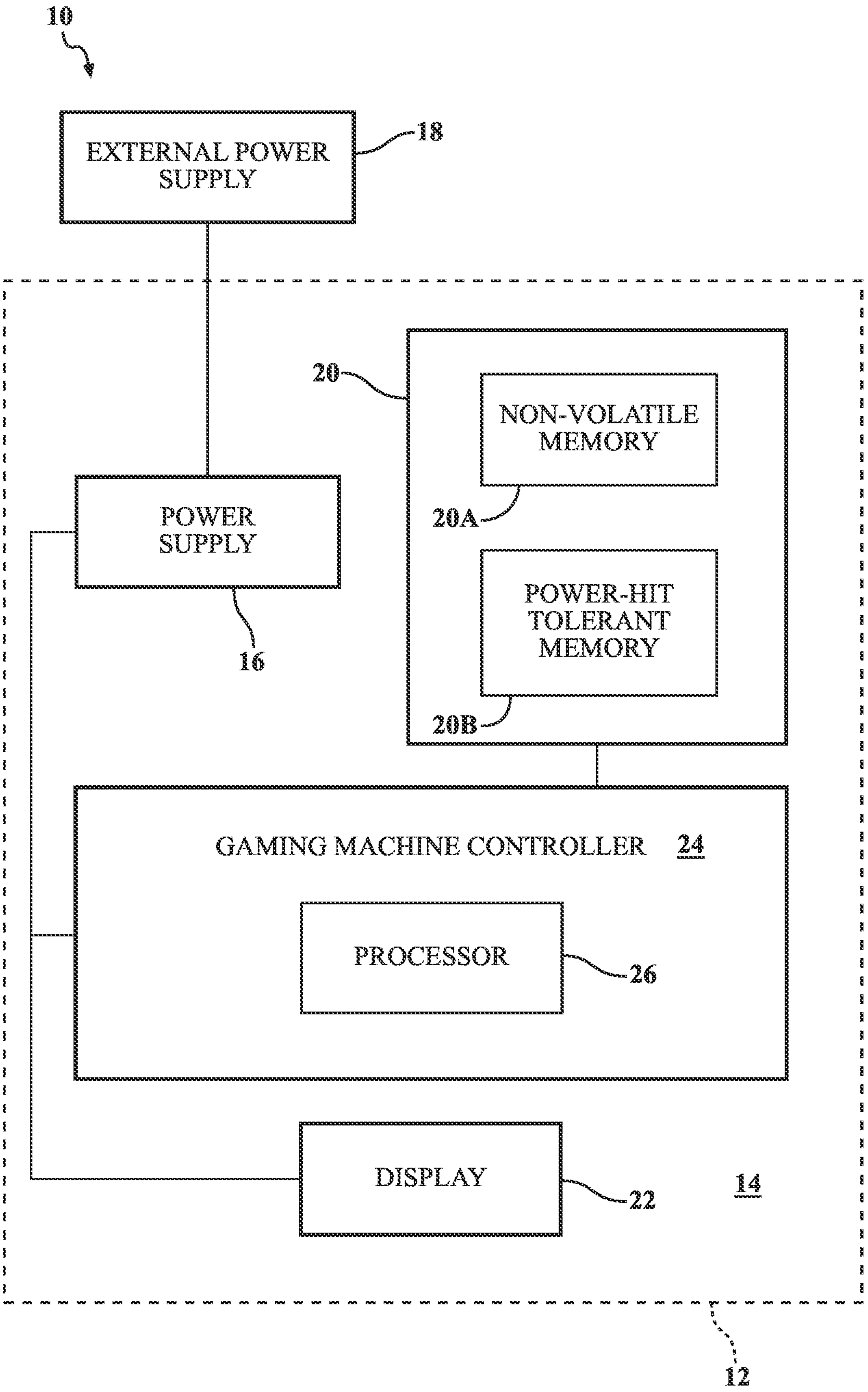
FIG. 2B is a block diagram of a gaming machine, according to an embodiment of the present invention.
Figure 5:
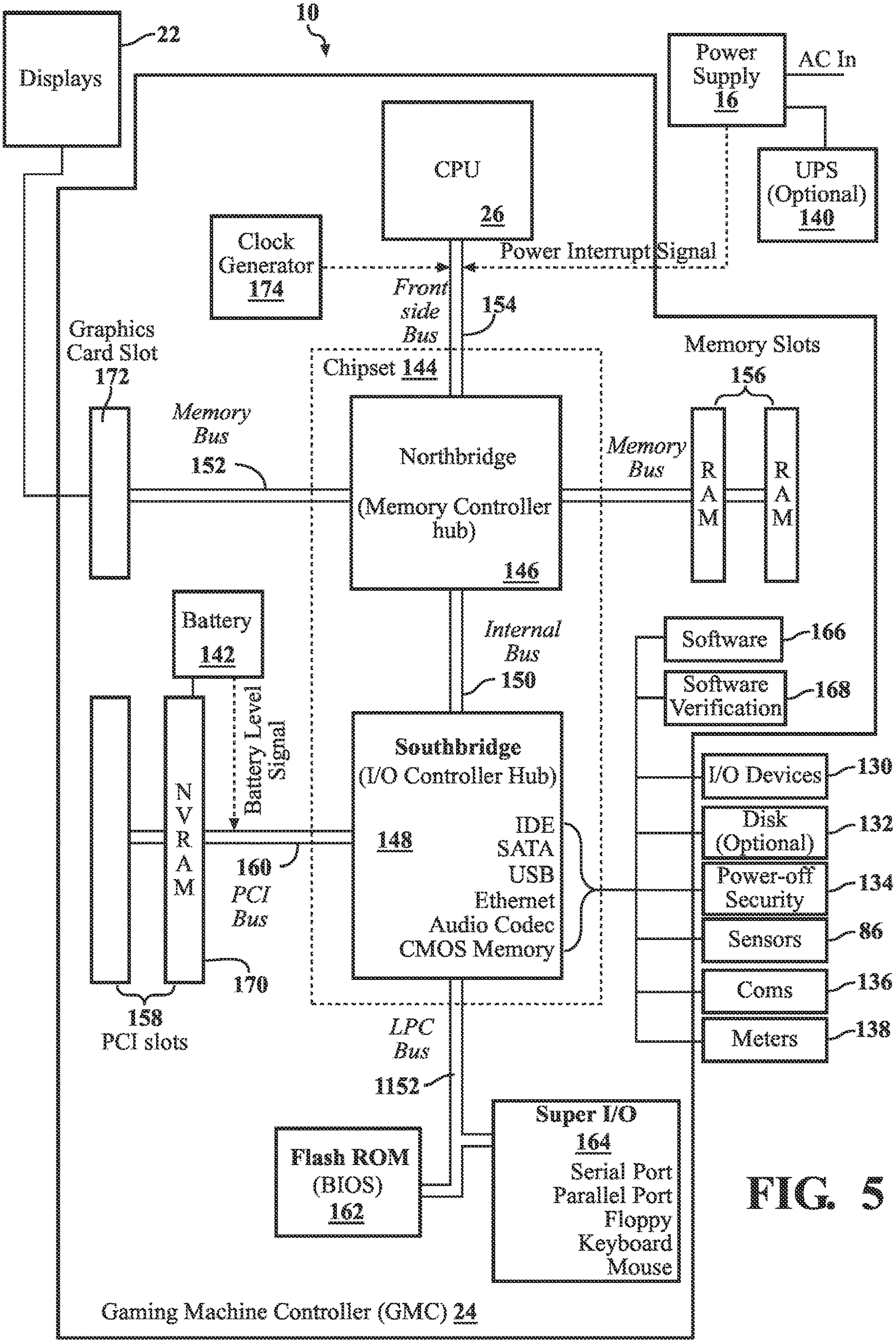
FIG. 5 illustrates a block diagram of gaming machine components including a gaming machine controller in accordance with the present disclosure.

As shown in FIGS. 2B and 5, in the illustrated embodiment, the gaming machine 10 includes a cabinet 12, a power supply 16, a memory or memory device 20, a display 22 and a gaming machine controller 24. The cabinet 12 has an interior 14 and may be lockable (sec below). The power supply 16 is disposed within the interior 14 of the cabinet 12 and receives power from an external power source 18.

The memory 20 is disposed within the interior 14 of the cabinet 12 and is configured to store non-transitory game software that is used to generate the wager-based game on the gaming machine 10. A plurality of virtual reel strips 30, a paytable 32, a set of winning paylines 34, and other crucial data associated with the wager-based game may also be stored within the memory 20. As discussed in more detail below, the memory 20 may include non-volatile memory 20A and power-hit tolerant memory 20B.

Figure 1B:
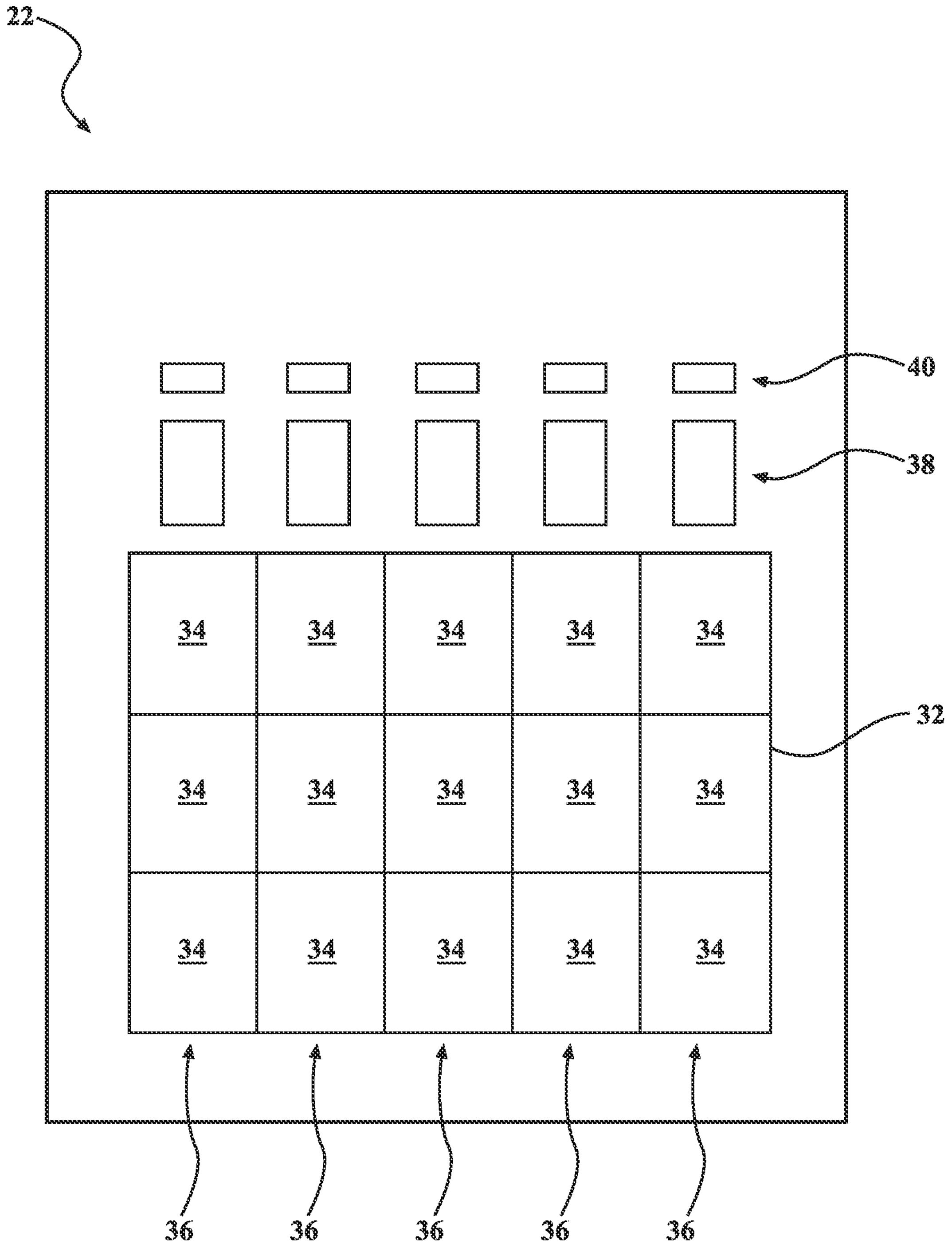
FIG. 1B is a graphic representation of a game or display screen for use with the base game and the feature game of FIG. 1A, according to an embodiment of the present invention.
Figure 1C:
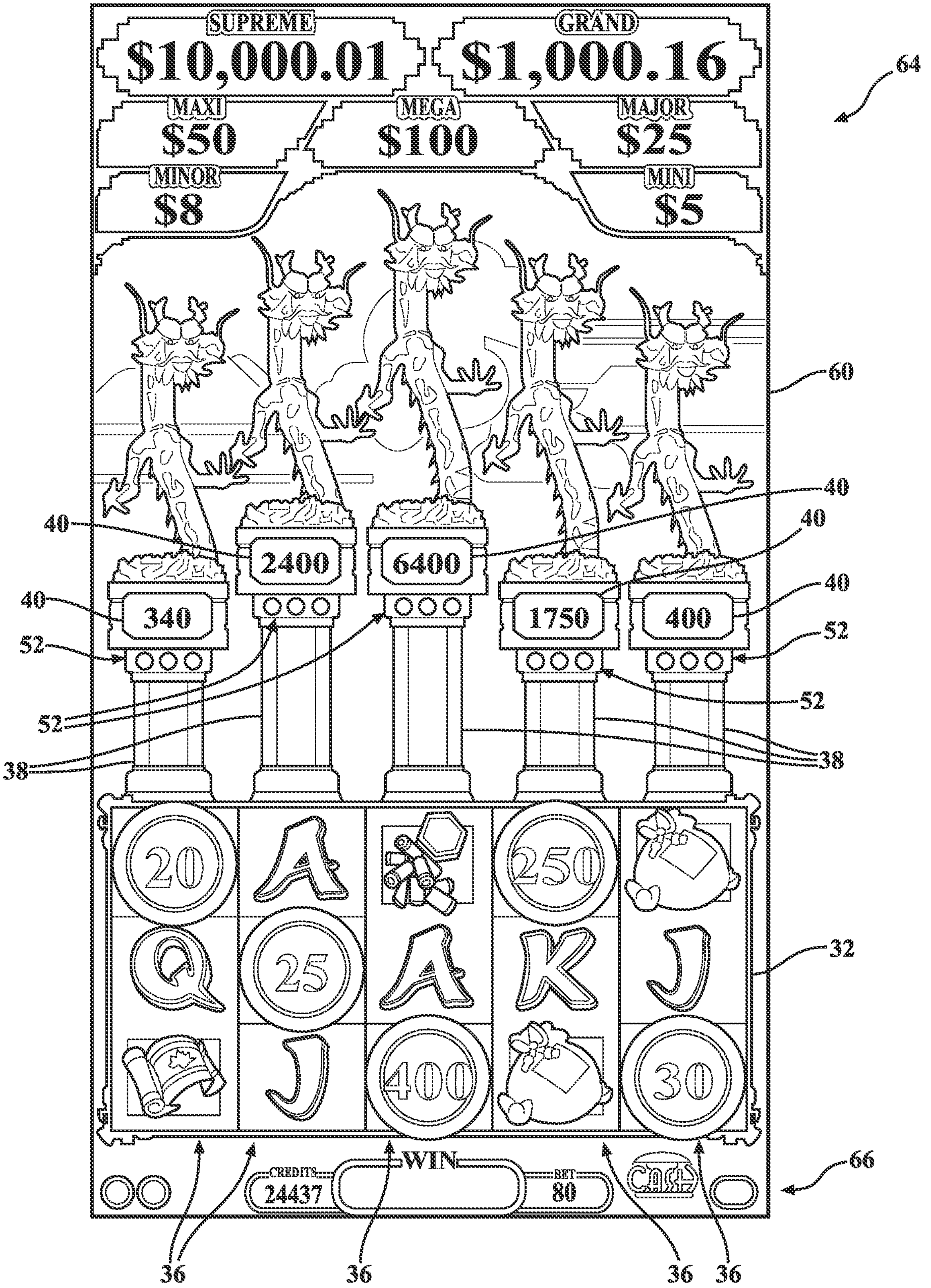
FIG. 1C is an illustration of an exemplary game screen for use in a game entitled, Pillars of Cash, having a base game and a feature game, according to an embodiment of the present invention.

With particular reference FIG. 1B, in one embodiment, the base game is a video slot game. During play of the base game, a base game display screen 30. During the base game, the base game display screen 30 includes a play grid 32 having a plurality of cells 34 arranged in a plurality of columns 36. In one aspect of the present invention, the crucial data includes a prize position counter and a prize accumulator associated with each column 36. Each prize position counter having an associated maximum value. Each prize accumulator has an associated initial value.

In the illustrated embodiment, a graphic representation 38 of each prize position counter positioned and a graphic representation 40 of each prize accumulator is shown on the base game display screen 30. As discussed in more detail below, the prize accumulators may be credit values and the graphic representations 40 of the prize accumulators display a current value of the respective accumulator. The graphic representation 38 of each counter may be an animation that is modified based on the current counter value.

With particular reference to FIGS. 1E-1 and 1E-2, each column 36 has an associated virtual reel strip 42. As shown, each virtual strip 42 has a plurality of symbol positions 44. Each symbol position 44 has an associated symbol 46 from a set of available symbols 48.

In the illustrated embodiment, the set of available symbols 48 includes:

- Game Symbols (h1, h2, h3, h3),
- Card symbols: Ace, King, Queen, Jack, 10, 9 (i1, i2, i3, i4, i5, i9),
- a Trigger or prize symbol (prize),
- a Wild symbol (ww), and
- a Scatter symbol (bn).

In the persistent feature, each triggering symbol may have an associated variable numeric prize. Prior to play (or instance) of each base game, a numeric prize is randomly established for each trigger symbol on each virtual reel 42. As shown, the display screen 60 may also include the current values of one or more progressive awards 64 and current credit meters As shown, the display screen 60 may also include the current values of one or more progressive awards 64 and current credit meters 66.

The gaming machine controller 24 includes a processor 26 and is disposed within the interior 14 of the cabinet 12. The gaming machine controller 24 is coupled to the power supply 16, the display 22, and the memory 20. The gaming machine controller 24 controls play of a plurality of instances of the wager-based game.

The Pillars of Cash game may also include a free spins feature. During an instance of the main game, if three, four or five scatter symbols occur in an outcome, the player may be awarded a predetermined number of free spins and a free credit award. The free spins and free credit award are paid or provided in addition to any line wins and are multiplied by the bet multiplier.

In Pillars of Cash, a feature game may also provided during the free spins. The feature game is persistent during the free spins, but the counters and accumulators are maintained separately. Other values, such as the maximum values for the position counters and the sets of available initial values for the accumulators may be different in the free spins than the base game. Additionally, different virtual reel strips (free spin virtual reel strips) 72 as shown in FIGS. 1F-1 and 1F-2 may be used. In the illustrated embodiment, the free spin virtual reel strips 72 may include more trigger symbols than the virtual reels 42. Additional free spins may be awarded during the free spins. For example, in the illustrated embodiment, the 2, 3, 4 and 5 scatter symbols may result in an additional 5, 10, 15 and 25, respectively, free spins being awarded. FIGS. 1K-10 contain exemplary help screens from the Pillars of Cash game.

Mystery Bet Feature

Figure 3:
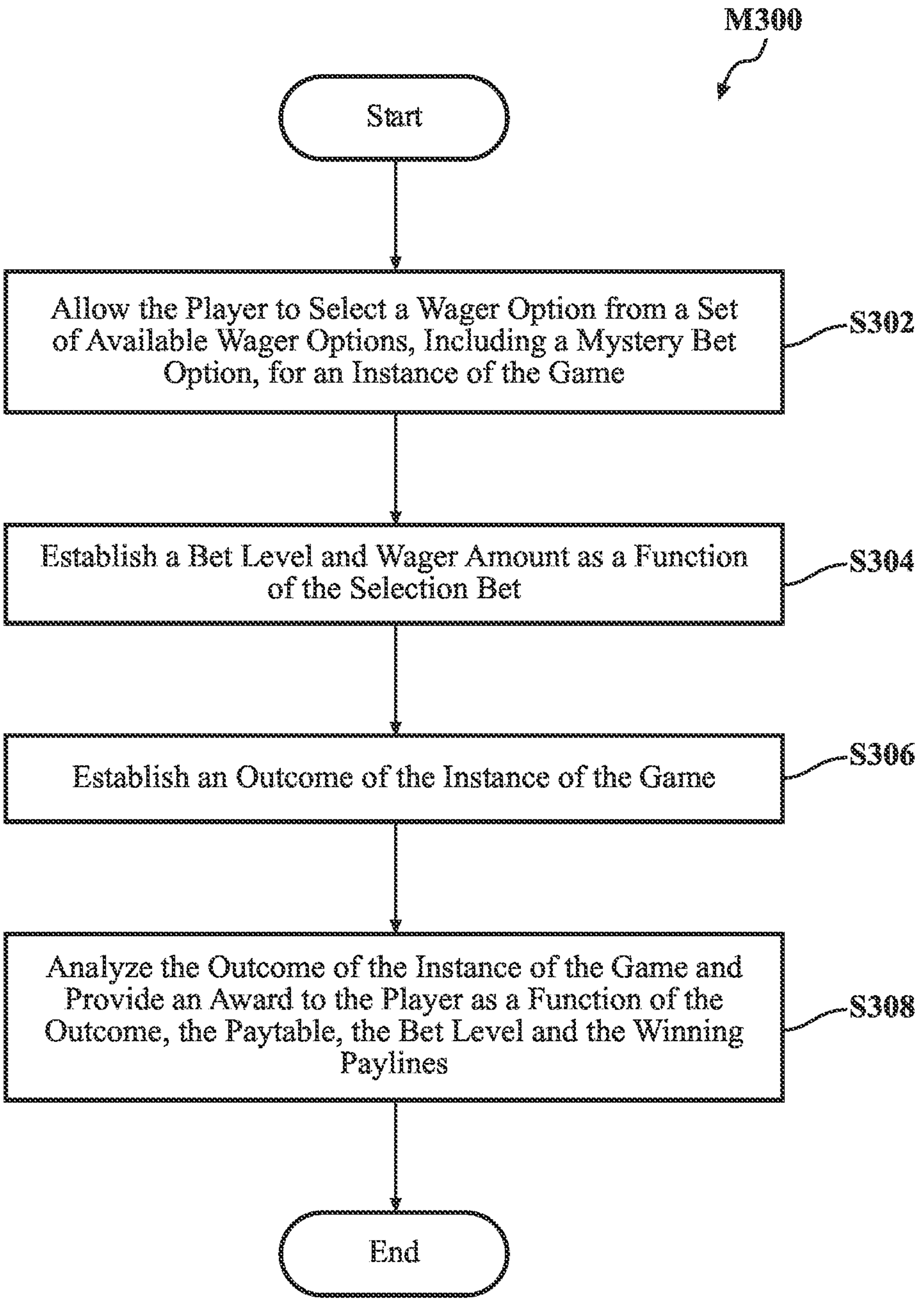
FIG. 3 is a flow chart depicting a machine implemented method associated with the base game and the persistent feature game, according to an embodiment of the present invention.

With respect to FIG. 3, the non-transitory game software controls the processor 26 to perform a game play method M300. An instance or play of the wager-based game is initiated when the player selects a wager option. As discussed above, the control or button panel 82 is used to present to the player a plurality or set of bet options. The set of available wager options includes a plurality of bet levels and a Mystery Bet Option. In the illustrated embodiment, the plurality of available bet options includes a minimum bet level and one or more multiples of the minimum bet option. In addition, the plurality of available bet options may include a mystery bet option (see below).

In a first step S302, an instance or play of the wager-based game is initiated when the player selects a wager option from a set of available wager options. As will be explained in more detail below, if the mystery bet option is selected by the player (for an instance of the video slot game), a bet level is randomly determined. For example, in one embodiment, the following bet options may be available: In the illustrated embodiment, the plurality of available bet options includes a minimum bet level and one or more multiples of the minimum bet option. In addition, the plurality of available bet options may include a mystery bet option. If the mystery bet option is selected by the player (for an instance of the video slot game), a bet level is randomly determined. For example, in one embodiment, the following bet options may be available:

In a second step S304, a bet level and a wager amount are established as a function of the selected wager option. The bet level is randomly established if the mystery bet option is selected by the user.

In a first embodiment, the wager amount (or required wager) associated with the randomly determined bet level is the wager amount associated with the randomly determined bet level. For example, if the player selects the mystery bet, a randomly determined bet level is selected from the available bet levels (or available bet level options): (×1), (×2), (×3), (×5), (×10) and the wager amount is the associated wager amount. For instance, if the (×3) bet level is randomly selected, then the required wager amount is 225 credits.

In a second embodiment, the Mystery Bet has a predetermined wager amount, e.g., 300 credits. Thus, the wager amount is fixed (and known before the Mystery Bet Option is selected) and independent of the randomly selected bet level.

The plurality of bet level options may include a base bet level and multiples of the base bet level. The base bet level may be referred to as "(×1)". In one example. The available multiples of the base bet levels may be (×2), (×3), (×5), and (×10). As discussed above, each of the base bet level and the multiples of the base bet level have an associated fixed wager.

The wager amount is decremented from the plater credit meters. In the first embodiment of the Mystery Bet, the wager amount associated with the Mystery Bet option is equal to the associated wager of the randomly established bet level. In the second embodiment of the Mystery Bet, the wager amount is a fixed amount, e.g., 300 credits.

In a third step S306, an outcome for the instance of the wager-based game is randomly established. For example, in the exemplary video slot game the outcome includes a stop position associated with each virtual reel strip on the associated column resulting in a game symbol in each cell of the play grid.

Figure 1D:
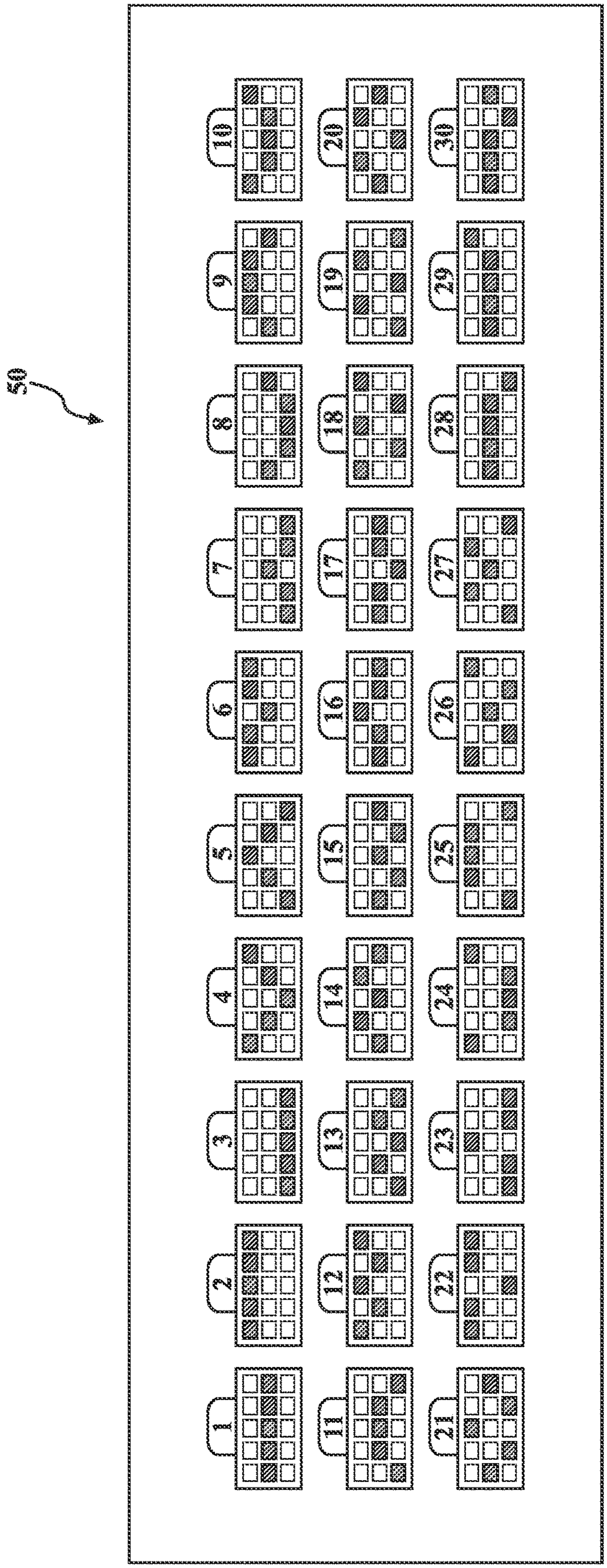
FIG. 1D is a representation of a set of winning paylines for use in the base game of FIG. 1C.
Figure 1H:
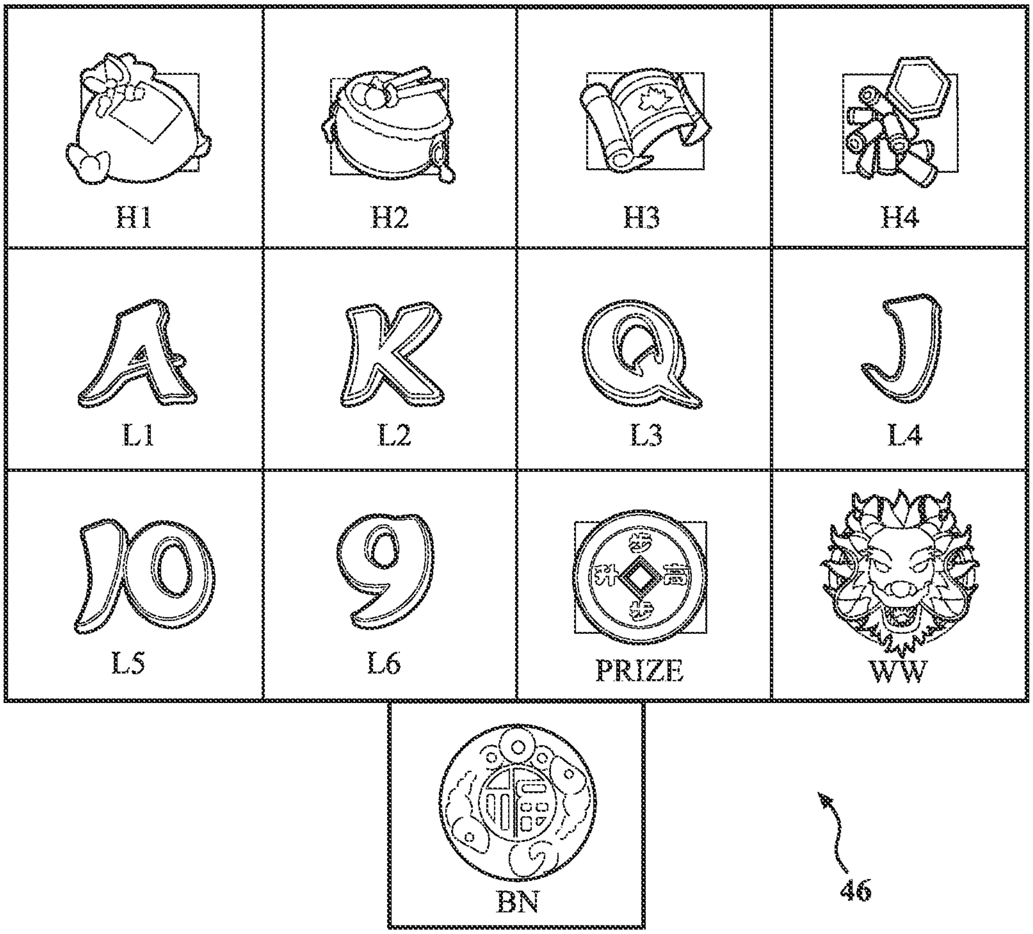
FIG. 1H is a chart illustrating the game symbols used in the base game, persistent feature game and free spins, according to an embodiment of the present invention.
Figure 1I:
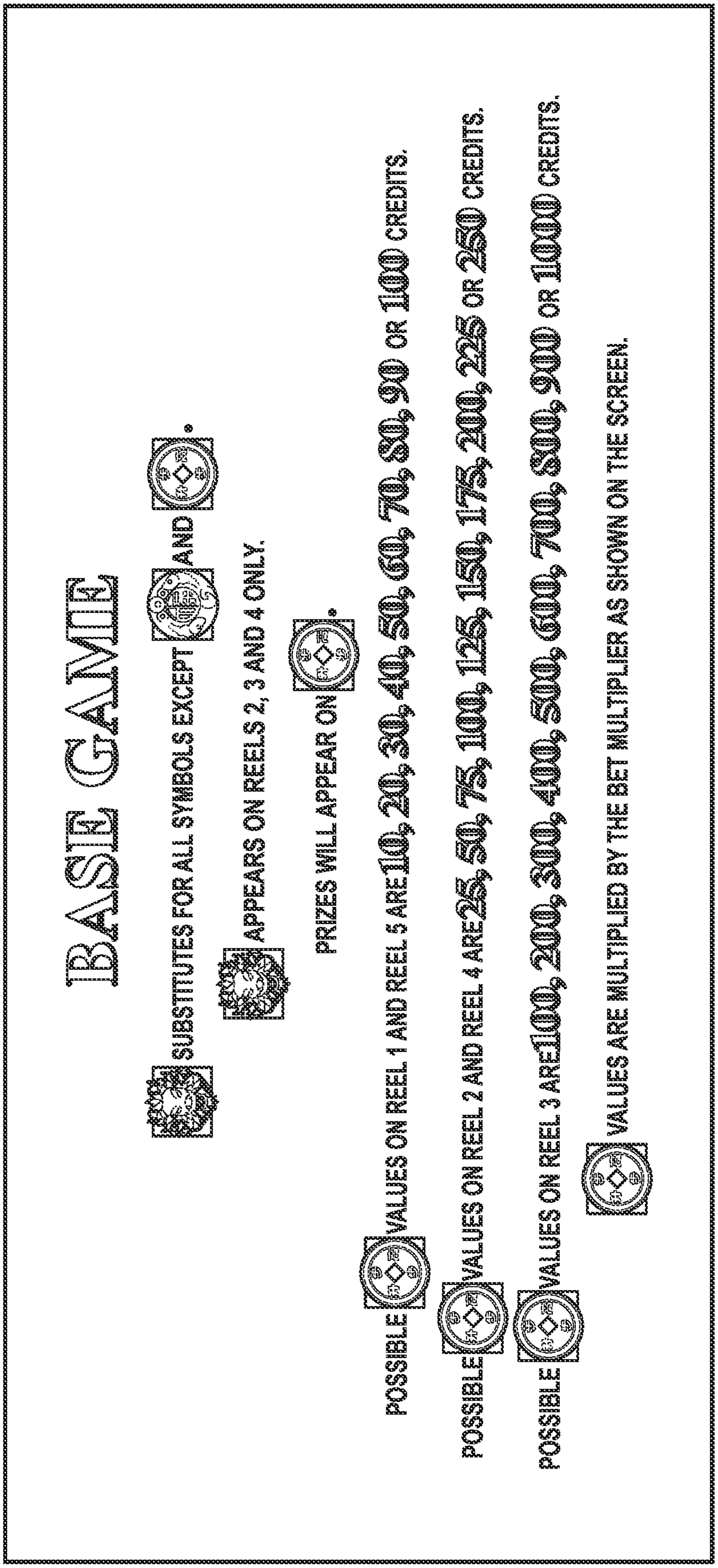
Figure 1J:
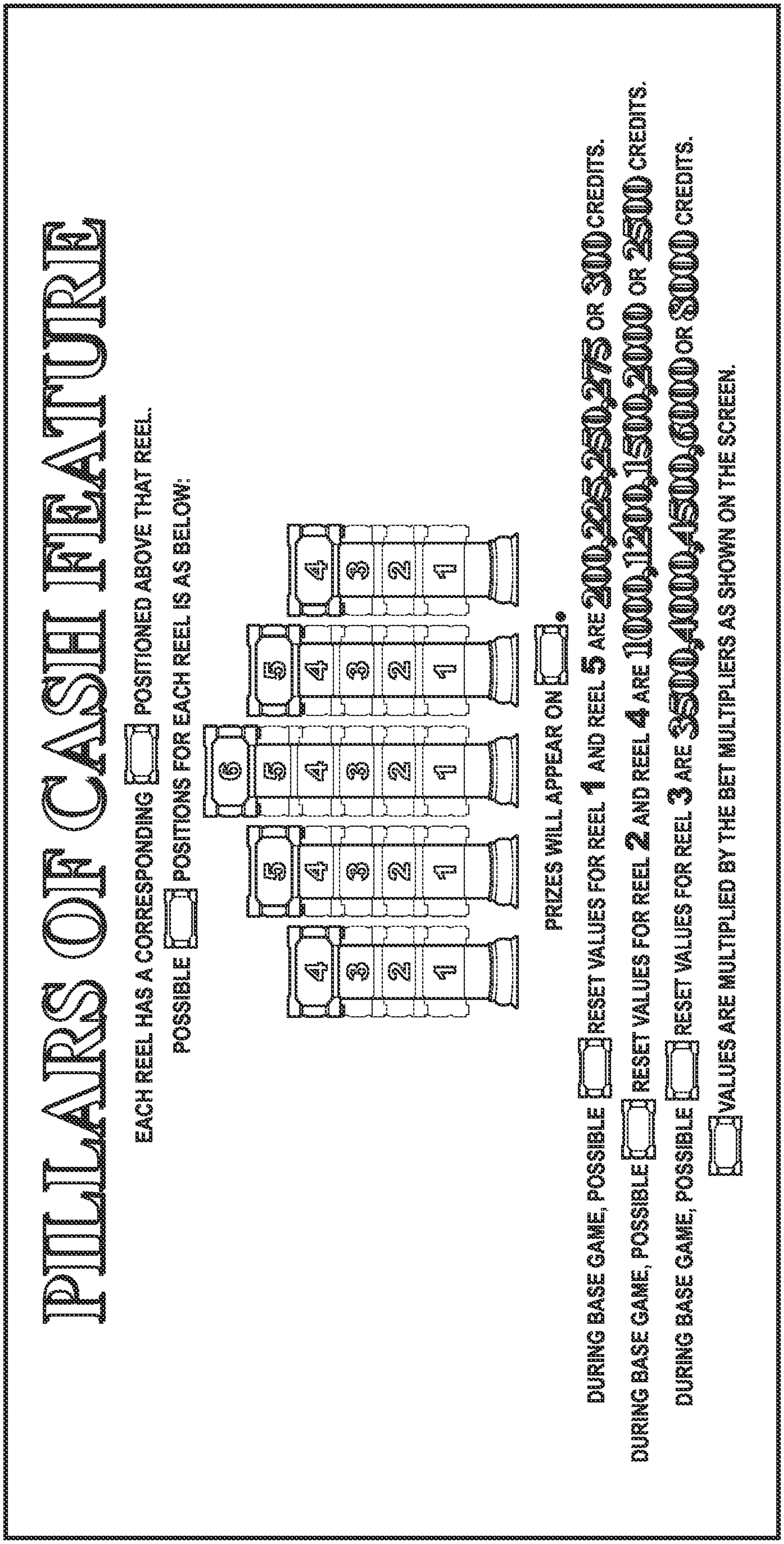
Figure 1K:
Figure 1L:
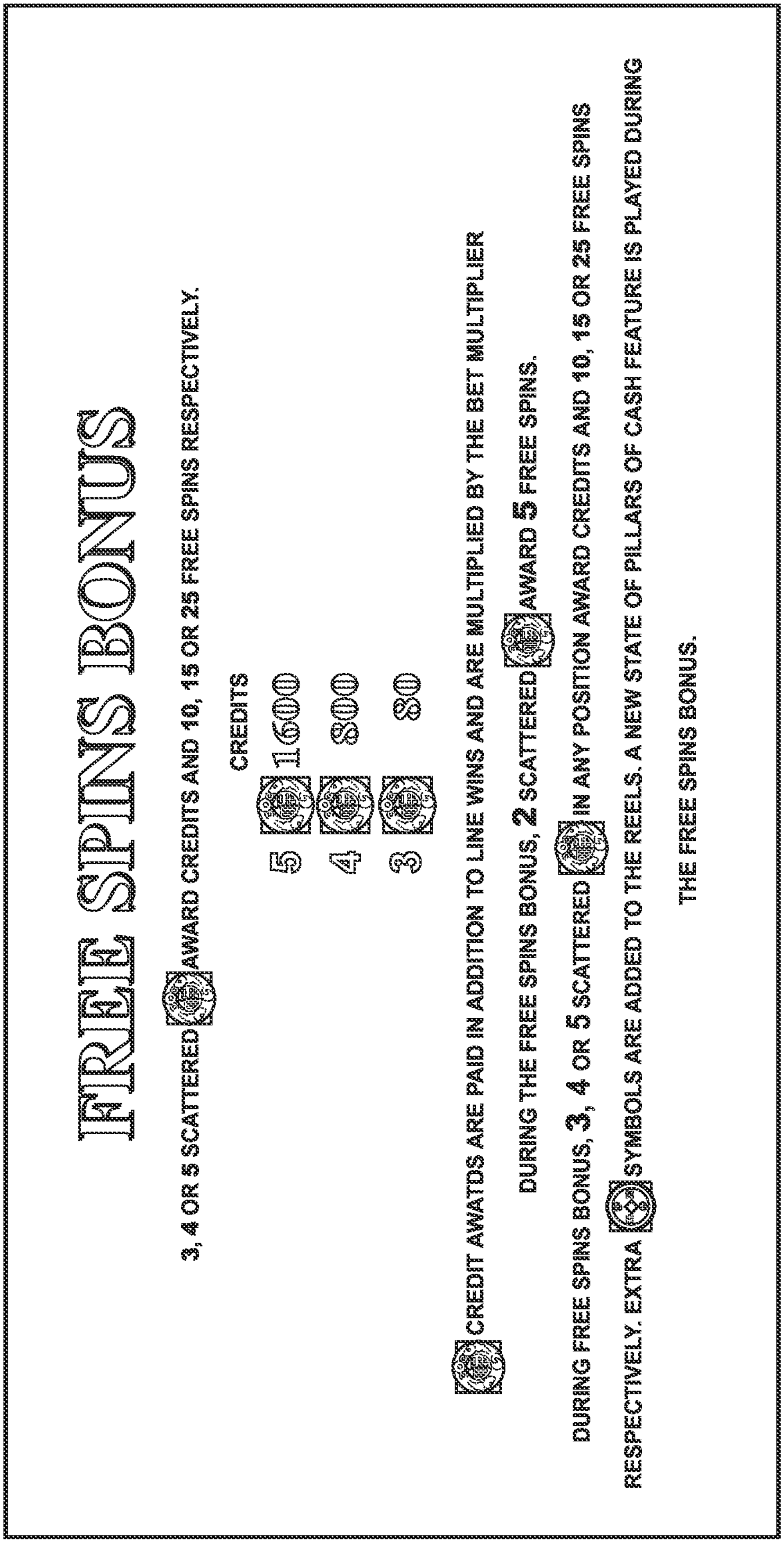
Figure 1M:

In a fourth step S308, the outcome of the instance of the wager-based game is analyzed and an award to the player is provided as a function of the outcome, the paytable, the bet level, and the winning paylines. Therefore, the array of symbols 46 in the grid 32 are compared against one or more played paylines and if the symbols 46 in the grid 32 match one of the played paylines then the player may be awarded a payout or award based on the array of symbols 46 and a paytable. A set of available pay lines 50 available during the base game is shown in FIG. 1D. In the illustrated embodiment, the set of available pay lines 50 includes 30 pay lines. However, the number of paylines played during any instance of the wager-based game is dependent upon the wager made by the player. For instance, in one embodiment all 30 pay lines are played in the player makes a MAX bet or wager. In analyzing the outcome of the instance of the game, in one aspect of the present invention, the Wild symbol substitutes for any of the other symbols except for the Scatter and the Trigger symbols. An exemplary paytable 51 is shown in FIG. 1G.

Each bet level option has an associated probability. In one embodiment the probabilities are equal. In another embodiment the probabilities may be weighted. For example, at least one probability is different from another one of the plurality of probabilities.

Figure 11A:
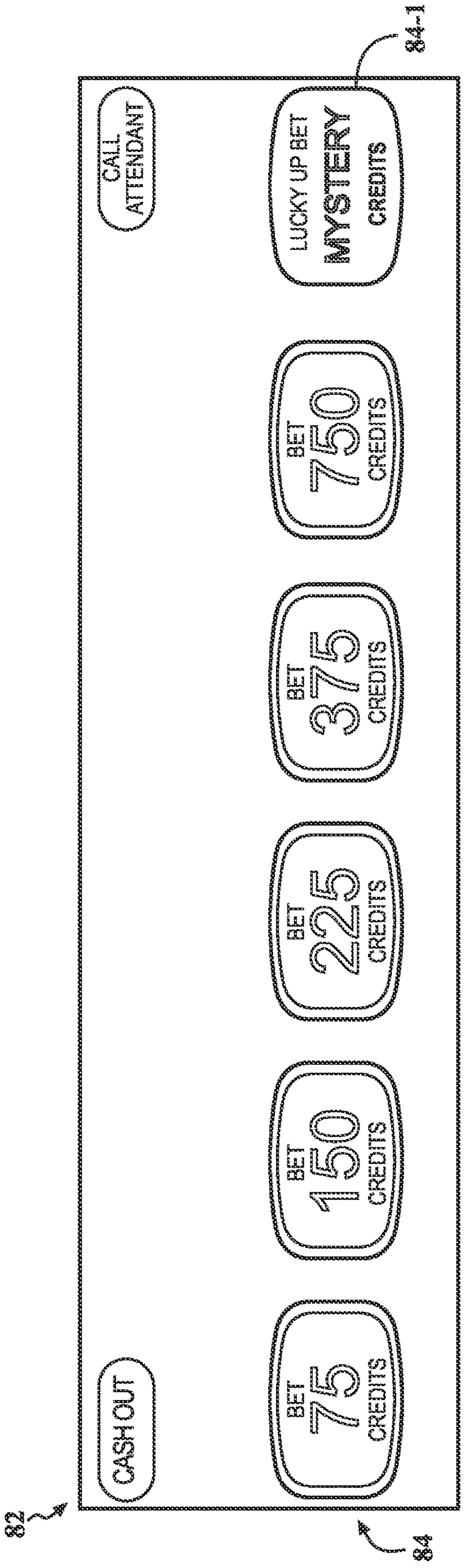
FIGS. 11A-11D are illustrations of a button panel associated with the gaming machine, according to different embodiments of the present invention.
Figure 11B:
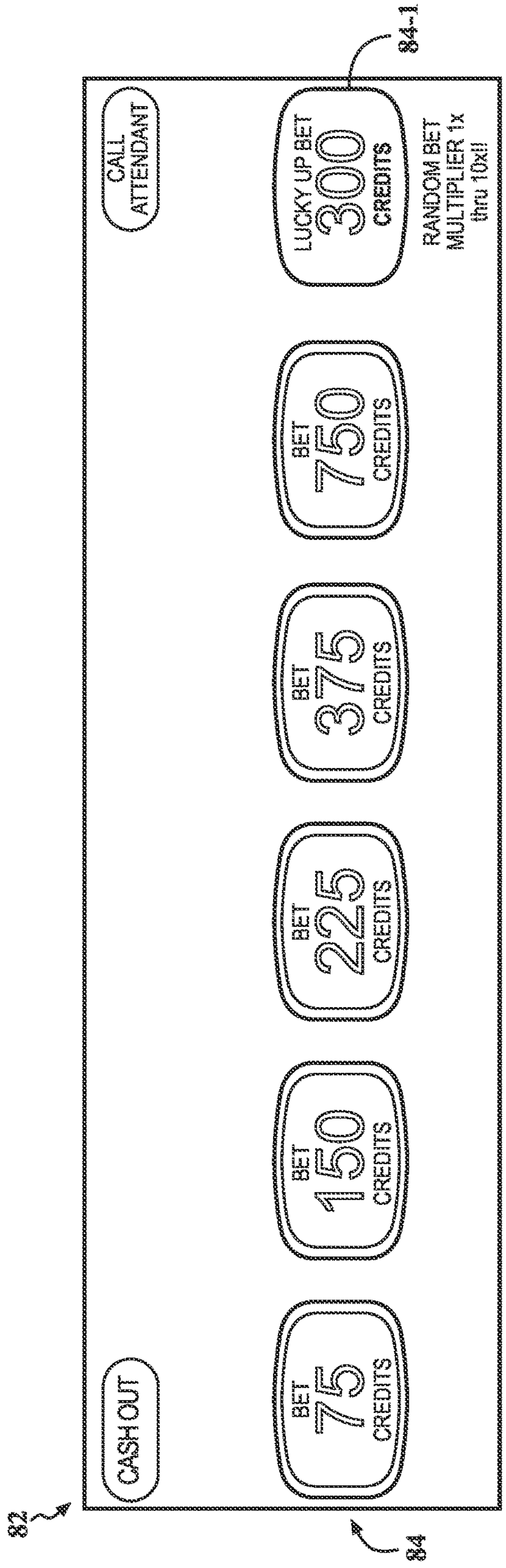

With reference to FIGS. 11A and 11B, an exemplary control or button panel 82 configured for the first and second embodiments of the Mystery Bet feature, respectively, is shown. As discussed above, the button panel 82 includes a plurality of buttons 84 that allow the player to select different bet options. The button panel 82 and buttons 84 may be implemented by a series of physical or mechanical buttons or as virtual buttons on a touchscreen device.

In FIGS. 11A and 11B, the buttons 84 include a minimum bet level ((×1)) and a plurality of multiple bet level ((×2), (×3), (×5), (×10)) buttons. In the illustrated embodiment, the minimum bet level is 75 credits and the multiple bet levels are 75, 150, 225, 375 and 750 credits, respectively. The button panel 82 also includes a Mystery Bet button 84-1. As discussed above, actuation by the player of any one of the buttons 84, 84-1 on the button panel 82 initiates an instance of the wager-based game. In the first embodiment of the Mystery Bet feature, actuation of the Mystery Bet button 84-1 results in a random selection of one of the bet options ((×1), (×2), (×3), (×5), (×10)). The wager amount associated with the randomly selected wager option is decremented from the credit meter.

In the second embodiment of the Mystery Bet feature, actuation of the Mystery Bet button 84-1 results in a random selection of one of the bet options ((×1), (×2), (×3), (×5), (×10)). However, the wager amount is fixed or a predetermined amount, e.g., 300 credits.

Figure 11C:
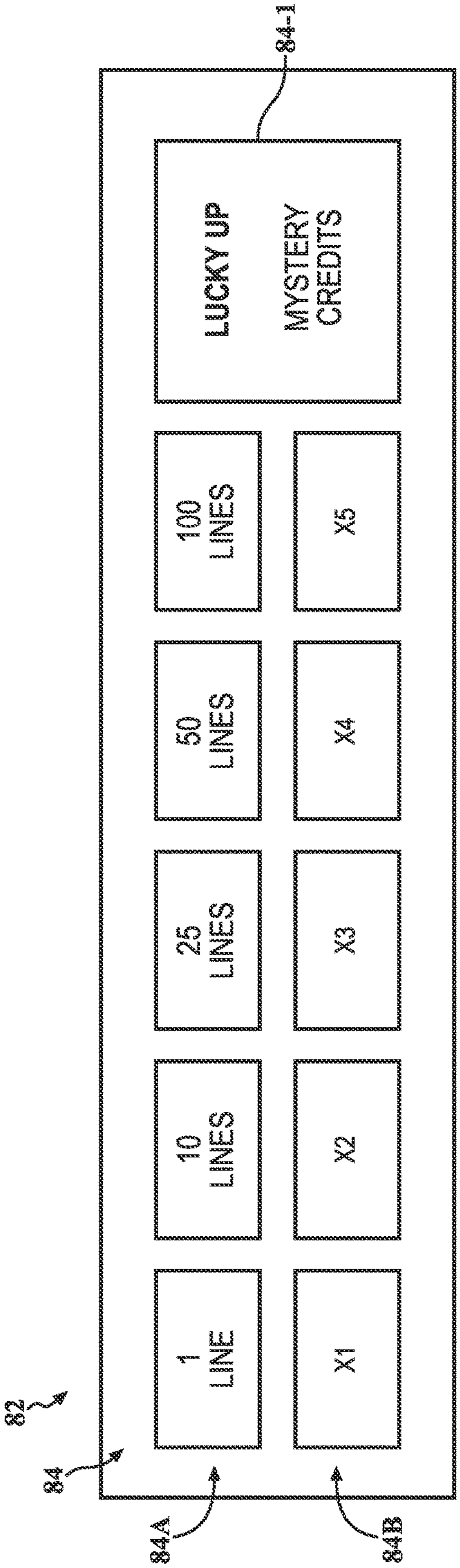
Figure 11D:
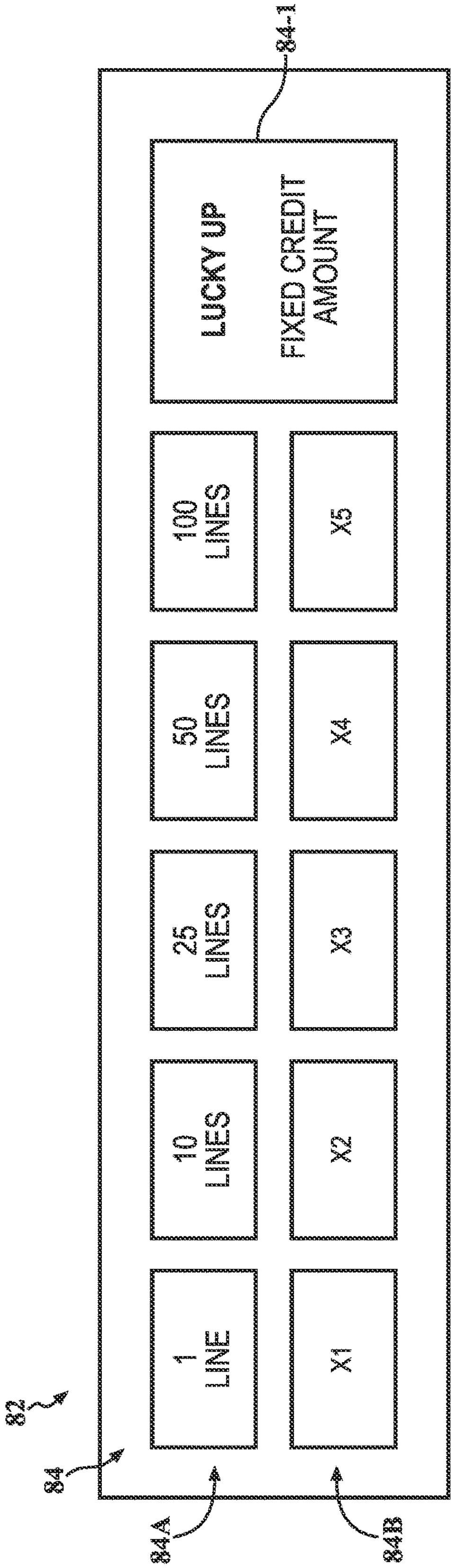

With reference to FIGS. 11C and 11B the Mystery Bet feature may be modified to other bet configurations. For instance, some (video or mechanical) slot games allow a player to play or select a plurality of paylines to play. In one example, a video slot game may have or provide 100 paylines. The player may elect to play all or a subset of the available paylines. Generally, the wager amount is determined as a function of the number of paylines played. In the illustrated embodiment, a video or mechanical slot game may have 100 paylines. The player may elect to select from a group or subset of the available paylines from a set of subsets of the available paylines. In the illustrated embodiment, the player may select from the following subsets of paylines: 1 line, 10 lines, 25 lines, 50 lines, and 100 lines using a plurality of paylines buttons 84A. In addition, the player may select a bet multiplier from a set of available bet multipliers, e.g., (×1), (×2), (×3), (×4), (×5) using the bet multiplier buttons 84B or the Mystery Bet button 84-1.

As shown, the Mystery Bet Feature may be provided with either a mystery credit Lucky Up feature or a fixed credit amount Lucky Up Feature. In the first embodiment, the mystery credit Lucky Up feature, the player may first select the number of lines to be played, then select one of the betting options or multiplier or Lucky Up Mystery Bet button 84-1. In the second embodiment, the fixed credit amount may be dependent upon the number of paylines played or selected by the player.

Gaming System

FIG. 1A illustrates part of an automated gaming system 100 in accordance with the disclosure that includes a wager-based gaming machine 10 (e.g., a slot machine). The wager-based gaming machine 10 can include wireless or wired communication interfaces which allow communications with remote servers and/or other devices including a remote services providing network 102 (e.g., having service providing servers and/or other data storing, communicating and data processing units—not explicitly shown). The services providing network 102 can provide privacy/integrity-secured services such as but not limited to player tracking and progressive gaming. Some specific network services are described in more detail in conjunction with FIG. 2A. The player tracking service can be part of a slot accounting system 118 that for example keeps track of each player's winnings and expenditures (including, in some embodiments, player contributions to one or more progressive jackpot pools). In addition, the gaming machine 10 can include wireless communication interfaces, such as a wireless interface which allow communication with one or more mobile devices, such as a mobile phone), a tablet computer, a laptop computer and so on via respective wireless connections such as a cellular, wifi or Bluetooth network. The wireless interface can employ various electronic, optical or other electromagnetic wireless and secured or non-secured communication protocols, including for example TCP/IP, UDP/IP, Bluetooth™ or Wi-Fi.

The respective mobile phones and/or tablet computers and/or other mobile devices can be owned and/or utilized by various players, potential customers, authorized casino operators or authorized gaming inspectors. A mobile device carried by a player can be configured to perform secured gaming-related functions, such as functions associated with transferring funds to or from the specific gaming machine 10 and the primary player's account(s) or functions related to player tracking. A mobile device carried by a casino operator can be configured to perform secured operator-related functions, such as performing hand pays, responding to tilt conditions or collecting metering related information. A mobile device carried by an authorized gaming inspector (not shown) can be configured to perform inspection related functions, such as actuating software verification procedures.

Use of mobile devices is not limited to secured transactions. In one embodiment, mobile devices may be used for social networking. For example, a primary player 28 may authorize his/her mobile device to automatically interact with a currently used gaming machine 10 for the purpose of automatically posting to a user-chosen social network various announcements such as, but not limited to, that the primary player 28 has been having fun playing a wager-based game for X hours at the given gaming establishment or that the Lucky Kitty Boosted Features game has just awarded the primary player 28 a symbols upgrade that now gives that player an opportunity to spin for a jackpot and/or other awards. The primary player 28 may alternatively or additionally authorize his/her mobile device (e.g., 1006) to automatically announce (wirelessly) to a selected group of friends or associates that player 28 has just been awarded an opportunity to spin for a jackpot and/or other awards and inviting them to stop by and watch the fun (e.g., as nearby other person 1009 is doing over the shoulder of the primary player 28, where the latter in one embodiment, is seated in chair 1003 situated in front of gaming machine 10.)

According to the same or an alternate embodiment, the primary player 28 may use his/her mobile device to temporarily reserve the particular gaming machine 10 for a predetermined amount of time (e.g., no more than say 10 to 30 minutes) so that the primary player may temporarily step away to attend to various needs. While the primary player 28 is temporarily away, the gaming machine 10 may display a reservation notice saying for example, "This machine is reserved for the next MM minutes by a winning player who, thanks to Boosted Features action, was recently awarded a lucky opportunity to spin for a jackpot and/or other awards. Stand by and watch for more such lucky opportunities!" (where here MM is a progressively decreasing time counter). The reservation notice may be prominently posted on an upper display 1012 of the gaming machine 10 as shall next be described.

The gaming machine 10 can include a mechanically-lockable base cabinet 12 and an upper or top box 74 fixedly mounted above the cabinet 12. The display 22 may be mounted inside, or to, the top box 74. As discussed above, the display 12 is used during play of the wager-based game. While the electronic game machine 10 is not being played, video, graphics, animations may be played on the display 12 to attract players.

In accordance with one aspect of the present disclosure, security measures are automatically and repeatedly taken to assure that only approved software programs are installed and run on or for the slot or other software driven gaming apparatuses. Briefly and for sake of introduction, a gaming control program (e.g., one composed of executable code and control data) may be installed into the network services block 102 by a software driven installer 106 that is brought on-site by an authorized technician. At the time of installation, the installer 106 also stores software verification data into database 108. Later when the installed gaming control program is called on, but before its execution proceeds, a software driven verifier 110 automatically accesses the stored verification data in the database **102*b* and uses it to verify that the called upon program is the same as the originally installed program. This can prevent software hackers from maliciously introducing unapproved gaming control code into the network services block 102** with the aim for example, of causing a jackpot or other such benefits to be awarded to them themselves or to their associates.

It will be appreciated by those familiar with gaming environments that participants in various gaming environments (also briefly see FIG. 2A) include respective players 28 who are directly using their respective slot machines 10 and are each typically seated on a chair disposed in front of the gaming machine so as to thereby position that primary player's eyes substantially level with a central vertical position (along the vertical Z axis) with a primary game outcome display area of the gaming machine 10.

Still referring to FIGS. 1A and **1*n* terms of yet further details for one embodiment, the base cabinet 22 includes an internal access entry mechanism instantiated for example as a door 76. The door 76 swings outward and is coupled to a back portion. The door 76 may include a locking mechanism. During normal operation, the door 76 is locked. Typically, unlocking the door 76 causes the gaming machine 10** to enter a tilt mode where gaming functions, such as the play of a wager-based game, are not available. This tilt mode can be referred to as a hard tilt.

The cabinet 22 can include a number of apertures that allow access to portions of a number of devices which are mounted within the cabinet. These gaming devices can include, but are not limited to, the display 22, speakers, a printer 78, a bill acceptor 80, a magnetic and/or chipped card reader and a resting shelf and/or control or button panel 82 including buttons 84. As described in more detail below, these gaming devices can be used to generate wager-based game play on the gaming machine 10.

In particular embodiments, the bill acceptor 80 can be used to accept currency or a printed ticket which can be used to deposit credits into an account maintained for the primary player 28 and/or the gaming machine 10. The credits can be used for wagers. The printer 78 can be used to print tickets to transfer credits from one gaming machine 10 to another or to monetize accumulated credits. Typically, the tickets can be redeemed for cash or additional game play, such as game play on another gaming machine or at a gaming table.

The bill acceptor 80 and printer 78 printer can be part of ticket-in/ticket-out (TITO) system 114 illustrated in FIG. 2. The TITO system 114 can be included as one of the secured services provided by the services network 102. The TITO system 114 allows a ticket printed at a first gaming machine 10 with a credit amount to be inserted into a bill acceptor 80 at a second gaming machine 10 and validated for game play. After validation, the credit amount associated with the ticket can be made available for game play on the second gaming machine. Additional details of the TITO system 114 are described below in conjunction with FIG. 2A.

The bill acceptor 80 can include a slot surrounded by a bezel which allows banknotes of various denominations or printed tickets to be inserted into the bill acceptor. The bill acceptor 80 can include sensors for reading information from the banknotes and determining whether the banknotes inserted through the slot are valid. Banknotes determined to be invalid, such as damaged or counterfeit notes, can be automatically ejected from the bill acceptor 80. In some instances, the bill acceptor 80 can include upgradeable firmware and a connection to additional network services. Via the network connection, new firmware, such as new counterfeit detection algorithms can be downloaded for installation into the bill acceptor 80.

The bill acceptor 80 may include mechanisms for guiding the banknotes or printed tickets past the internal sensors. Banknotes or printed tickets which are accepted can be guided to a bill stacker (not shown) located within the cabinet 22 of the gaming machine 10. The bill stacker can hold a maximum number of bank notes or printed tickets, such as up to two thousand.

The gaming machine 10 can include a sensor for detecting a fill level of the bill stacker. When the bill stacker is full or close to being full, the gaming machine 10 can be placed in a tilt mode. Next, the cabinet door 76 can be opened by authorized casino personnel and the full bill stacker can be replaced with an empty one. Then, the door 76 can be closed and the gaming machine 10 can be restored to a normal operational mode in which it is available for game play.

One function of the printer 78 is to print "cash out" tickets. In a "cash out," credits available on the gaming machine can be transferred to an instrument, such as a printed and/or magnetically encoded ticket, or wirelessly transferred by way of a secure link to an appropriate account (e.g., the primary player's account) for later access. Typically, a "cash out" can be initiated in response to pressing one of the physical buttons 84, or touch screen button output on a display, such as display 22 or a secondary display (not shown) to be smaller than and disposed above or the 22.

In one embodiment, the printer 78 can be a thermal printer. The printer can be loaded with a stack of tickets, such as a stack with two hundred, three hundred or four hundred tickets. Mechanisms in the printer can grab tickets from the ticket stack and transport the tickets past the print heads for printing. The ticket stack can be located in an interior of the gaming machine cabinet 22.

The printer 78 can include sensors for detecting paper jams and a status of the ticket stack. When a paper jam or low ticket stack is detected, the gaming machine 10 can enter a tilt mode where game play is suspended. In one embodiment, a tower light 116 disposed above the upper box 74 can light to indicate the tilt status of the gaming machine 10. After the tilt condition is cleared, such as by clearing the paper jam or replenishing the ticket stack, the gaming machine 10 can enter a normal operational mode where game play is again available.

In particular embodiments, the printer 78 can be coupled to a gaming machine controller (see gaming machine controller 24 in FIG. 5). The gaming machine controller 24 can be configured to send commands to the printer which cause a "cash out," ticket to be generated. In addition, the printer 78 can be coupled to other systems, such as a player tracking system (e.g., 118 in FIG. 2). When coupled to the player tracking system, commands can be sent to the printer 78 to output printed tickets redeemable for comps (comps refer to complimentary awards, such as but not limited to free credits, a free drink, a free meal or a free room) or printed coupons redeemable for discounts on goods and services.

As mentioned, in some embodiments, one or more wireless interfaces 1046 can be provided to operate as secured and/or unsecured wireless communication connections 1036. The wireless connections can be established for example between the gaming machine 10 and one or more mobile devices, such as smart phone 1006. The wireless connection 1036 can be used to provide functions, such as but not limited to player tracking services, casino services (e.g., ordering drinks) and enhanced gaming features (e.g., displaying game play information on the mobile device). The wireless connection 1036 cannot, however, be used to provide reconfiguration of EGM's and/or their associated controllers (e.g., the progressive pool controllers or PPAC's). The wireless interface can be provided as a stand-alone unit or can be integrated into one of the devices, such as the bill/ticket acceptor 78 and the card reader 1028. In addition, the bill/ticket acceptor 78 and the card reader 1028 can each have separate wireless interfaces for interacting with the mobile device. In one embodiment, these wireless interfaces can be used with a wireless payment system, such as Apple Pay™ or Google Pay™. The wireless payment system can be used to transfer funds to the gaming machine that can be used for wager-based game play.

The door 76 can allow secured entry or access to an interior of the cabinet 22. Via this access, devices mounted within the cabinet, such as the display 22; speakers; bill/ticket acceptor 78 or printer 80 can be serviced and maintained. For example, a receptor configured to receive currency and tickets, coupled to the bill acceptor, can be emptied. The receptor is often referred to as a bill stacker. In another example, blank tickets can be added to the printer 78 or paper jams can be cleared from the printer. When door 76 is opened, the gaming machine can enter a hard tilt state where game play is disabled. Although not explicitly shown, the audiovisual input/output mechanisms of the gaming machine 10 need not be limited to the displays 22; speakers and the buttons 84. Additional audiovisual input/output mechanisms may come in the form of touch-sensitive screens, haptic input/output devices such as vibrators, subwoofers, microphones for picking up verbal requests or audible indications of excitement by the primary player or adjacent other persons and so on. In one embodiment, the chair may be instrumented so as to detect not only when the primary player 28 is seated on it, but also when that player is jumping up and down or otherwise moving in the chair due to heightened emotions. This detected movement can be fed back to the services providing network 102 for adaptively learning what gaming combinations tend to provide more excitement and/or entertainment. With authorization by the primary player 28, a microphone and/or motion detector on his/her mobile device may be activated to provide similar automated feedback.

In addition, a number of further devices (not shown) can be provided within the interior of the cabinet 12. A portion of these devices is not visible through an aperture in the gaming machine cabinet 12. For example, the gaming machine controller 24 which controls play of a wager-based game on the gaming machine 10 can be found within the cabinet 12. Typically, the gaming machine controller 24 is secured within a separate lockable enclosure. Details of the gaming machine controller 24 are described below with respect in FIG. 5.

As another example, a number of security sensors can be placed within the interior of the cabinet 22. Security sensors 86 may be configured to detect access to the interior of the gaming machine 10. For example, the sensors can be configured to detect when the locking mechanism is actuated, the door 76 is opened or a locking mechanism associated with the gaming machine controller 24 enclosure is actuated. A power source, separate from an external power supply, such as a battery can be provided which allows the security sensors to operate and be monitored when the external power supply is not connected or stops functioning for other reasons.

In particular embodiments, the cabinet 22 can have a sheet metal exterior designed to provide the rigidity needed to support the top boxes 74 and light kits as well as to provide a serious deterrent to forced entry. For example, the sheet metal can be sixteen-gauge steel sheet. Additionally, the door 76, can be backed with sheet steel in the areas around the displays. Other materials, such as wood, wood composites, can be incorporated into the cabinet and the example of sheet metal is provided for the purposes of illustration only.

Speakers can be protected by a metal screen. In one embodiment, a speaker may include a subwoofer speaker portion. In general, a sound system associated with the gaming machine 10 can include an audio amplifier and one or more speakers of various types, such as subwoofers, midrange speakers, tweeters and two-way speakers that also accept voice input.

If the main cabinet 76 is entered, a "DOOR OPEN TILT" can be displayed halting game play and causing a "DOOR OPEN" event to be sent to the slot accounting system 118. In one embodiment, this message can be displayed on the display 22. These events can also be stored to the power hit tolerant memory. Upon door closure, the "DOOR OPEN TILT" will be replaced with a "DOOR CLOSED TILT" that can clear after the completion of the next game cycle. Additionally, a logic "DOOR OPEN TILT" can occur if the logic door is opened. The logic door is configured to be lockable independent of how the switch wiring is installed. The gaming machine 10 can be configured to initiate the logic DOOR "OPEN TILT" regardless of whether or not a lock is installed on the logic door.

The display 22, the speakers, the printer 78, the bill acceptor 80, the card reader and the button panel 82 can be used to generate a play of a wager-based game on the gaming machine 1008. Further, the display 22 can include a touchscreen function. The touchscreen function can be used to provide inputs used to play the wager-based game. Some examples of wager-based games that can be played include but are not limited to slot games, card games, bingo games and lottery games. The wager-based games are typically games of chance and utilize a random number generator to determine an outcome to the game.

In general, the wager-based games can be classified as Class II and Class III games. Class II games can include bingo, pull tabs, lottery, punch board, tip jars, instant bingo and other bingo like games. Class III games can include but are not limited to slot games, black jack, craps, poker and roulette.

As described above, the wager-based game can be a slot game. The play of the slot game can involve receiving a wager amount and initiating a start of the wager-based game. A selection of a wager amount and a start of the wager-based game can be performed using the buttons 84 on button panel 82. In addition, the button pane 821 can be used to perform gaming functions, such as selecting a number of lines to play in a slot game, selecting the amount to wager per line, initiating a cash-out and calling an attendant. These functions will vary for different types of games.

In some embodiments, a touch screen function can be provided in or adjacent to the display 22. The combination of the display 22 and touch screen can be used to perform gaming functions that performed using the button panel 82. Also, display and touch screen can be used to perform operator features, such as providing a game playback, or a hand pay.

The play of wager-based game, such as a slot game, can involve making a wager and then generating and outputting a game presentation. The bet amount can be indicated the display 22 (see for example FIGS. 1C and 1D). The game presentation can include a number of game features that vary from game to game. The game features provide variety in how the outcome to the wager-based is presented. For example, an award to the outcome of the game can be presented in a series of steps that vary from game to game. In some instances, a portion of the total award for a game can be awarded in each step. The steps and their graphical presentation can be referred to as game features. In various embodiments, information associated with one or more of the steps can be stored to a power hit tolerant memory. The power hit tolerant memory is discussed in more detail with respect to FIG. 7.

In particular embodiments, a portion of the award to the outcome of a game or spin can be presented as a bonus game or a bonus spin (e.g., a free spin). The portion of the award can be referred to a bonus award. The presentation of the bonus award can also be presented in steps where a portion of the bonus award is awarded in each step. These steps can be referred to as bonus game features. In some embodiments, information associated with the steps in the bonus game can be stored to the power hit tolerant memory. In various embodiments, components of the bonus game presentation can be presented on the display 22.

Next, referring to FIG. 2A, further details of one embodiment of the network services providing portion 102 and of gaming machine operations, including securitization features and possible points of weakness are described. In FIG. 2A, the gaming system 100 may include three banks of gaming machines, 126A, 126B and 126C. For purposes of illustration, three side-by-side gaming machines are shown in each bank although a different number could be used (e.g., 4, 5, 6 etc.) and different configurations (e.g., back-to-back rows).

The network services providing portion 102 includes a central determination server 120, a local progressive server 122, a wide area progressive server 124, a player tracking/slot accounting system server 118 and ticket-in/ticket-out (TITO) server 114. In gaming system 100, all of the gaming machines in each bank, 126A, 126B and 126C, are operatively coupled to the slot accounting system server 118 and the TITO server 114. However, only the gaming machines in bank 126A are coupled to the central determination server 120. Further, only gaming machines in bank 126B and display 1068 are coupled to the local progressive server 122. Finally, only the gaming machines in bank 126C are coupled to the wide area progressive server 124. The communication couplings between the gaming machines in each bank and the servers 120, 122, 124, 118 and 114 can be wired connections, wireless connections or various combinations/permutations thereof.

In various embodiments, the central determination server 120 can be used to generate a controlling portion of the game played on the gaming machines in bank 126A. For example, the central determination server 120 can be used to generate random numbers (e.g., by a pull tab method or otherwise) used to determine outcomes to the games played in bank 126A. In another example, the central determination server 120 can be used to generate all or a portion of the graphics used during play of the games on the gaming machines in bank 126A. For instance, the central determination server 120 can be configured to stream a graphical presentation of a game to a gaming machine 10. The streamed upper display graphics may include that which on occasion (e.g., randomly or pseudo-randomly) reveals an active special bonus situation (e.g., Possible Jackpot win Here; Enlarged Boosted Area Here, etc.), reveals the awarding of a substantial prize (e.g., Jackpot!!!) or the by-chance generation of an enlarged boosted-features area (e.g., 146). The streamed graphical presentations can be output to respective displays on respective ones of the gaming machines and also to additional larger displays mounted on walls or other fixtures near the respective bank of machines.)

In one embodiment, the central determination server 120 can be used to generate numbers used in a bingo type games played on the gaming machine in bank 126A. These bingo type games are often referred to as class II games whereas traditional slot machines are referred to as class III games. In class II games, a draw of numbers is made. The numbers can be mapped to a bingo card, which the player purchases to play the bingo game. The draw of numbers can result in at least one winning game combination on the bingo cards participating in the current bingo game.

The central determination server 120 can be configured to repeat the number draws for the bingo games at regular intervals. For example, number draws can be repeated every 20 milliseconds. Players at the various gaming machines coupled to the central determination server 120, such as the players at the gaming machine in bank 126A, can initiate bingo games which utilize the bingo numbers from a particular bingo number draw. The bingo numbers in the number draw can be mapped to a bingo card displayed on the screen of the gaming machine, such as 1064.

Wins can be indicated by a winning pattern on the bingo card, such as four in a row or four corners. In response to a winning pattern on a bingo card on a particular gaming machine, the central determination server 120 can send a prize amount associated with the win to the gaming machine with the winning pattern. This prize amount can be displayed on the gaming machine and the credits associated with the prize amount can be deposited on the gaming machine. For example, win of a bingo game on gaming machine 1064 can result in a prize amount being displayed on the main display. Further, the prize amount can be deposited as credits on the gaming machine 10 such that the credits are available for additional game play.

In one embodiment, the prize amount can be output to look like a slot game. For example, if the prize amount is ten credits. Video reels can be displayed spinning on a main display of the gaming machine and a reel combination associated with a ten-credit win in a slot game can be output to the display screen. If the outcome to the bingo game on a particular gaming machine is no award, then the video reels can be displayed spinning and a reel combination associated with no award in the slot game can be displayed on the gaming machine. This process can be repeated on various participating gaming machines, as number draws for various bingo games are initiated and completed on the central determination server 120.

The local progressive server 122 can be used to generate one or more progressive prizes that are limited to a local group of gaming machines, such as only the gaming machines in bank 126B. When games are played on the gaming machine in bank 126B, an amount of each wager can be contributed to one or more progressive prizes. The local progressive server can receive the contribution amounts from the gaming machines linked to the progressive game and can keep track of the prize amounts associated with the one or more progressive prizes. The prize amounts for the one or more progressive prizes can be output to displays on the participating gaming machines as well as to separate displays near the participating gaming machines.

The local progressive server 122 can be configured to receive information regarding gaming events on the participating gaming machines. For example, the local progressive server 122 can be configured to receive a notification from each of the participating gaming machines when a game outcome has occurred associated with a win of a progressive prize. In other examples, the local progressive server can be configured to receive gaming information, such as when each game is played on one of the participating gaming machines, an amount of wagered for each game and when one or more type of game outcomes occur on each of the gaming machines.

The gaming information associated with gaming events on the one or more gaming machines can provide a basis for additional bonus scenarios. For example, a bonus award can be triggered on one of the gaming machines after a random number of games are played on the gaming machines as a group. As another example, a bonus award can be triggered on one of the gaming machines after a particular game outcome occurs a random number of times on the participating gaming machines as a group, such as a particular combination of symbols appearing a random number of times.

The wide area progressive server 124 is connected to the gaming machines in bank 126C and display 22. The wide area progressive server 124 can be used to enable a progressive game played on gaming machines distributed over a wide area, such as multiple casinos distributed within a state. Similar to the local progressive server 124, when wagers are made, the wide area progressive server 124 can receive contributions to the progressive prize from the participating gaming machines. The wide area progressive server 124 can report these contributions to a remote device which tracks the total progressive jackpot. Further, if a progressive jackpot is won on one of the gaming machines to which it is connected, the wide area progressive server 124 event can be reported to the remote device. Yet further, the wide area progressive server 124 can receive a current progressive jackpot amount from the remote device. The current progressive jackpot amount can be reported on displays on the gaming machines participating in the progressive jackpot and/or nearby signage, such as 128.

An exemplary display 22 of yet another gaming machine or other display device (e.g., wide area display device) can have a digital sign controller 130. The digital sign controller 130 can have a network interface which allows it to communicate with a remote device, such as the wide area progressive server 124. In this example, the digital sign controller 130 can be configured to output information to display 1068 associated with the progressive game, such as a current jackpot amount.

In general, displays with digital sign controllers can be provided through out a gaming environment, such as casino. A digital sign controller 130 can be configured to communicate with a remote device. The remote device can be configured to send information to the digital sign controller to output to a display. The information can include video, audio and picture data. Further, the remote device can be configured to send commands to the display, such as a command to output information to the display. In one embodiment, the wide area display devices 128 may provide announcements of when particular gaming machines 10 in the local area have awarded beyond a predetermined threshold number.

The slot accounting system portion of server 118 can receive accounting information from each of the gaming machines 10 in system 100, such as an amount wagered for each game and amounts awarded on each gaming machine and/or the number of further extra gains awarded due to initially settled upon outcome combinations (e.g., K, A, WILD, Q) and follow up bonus award opportunities (e.g., boosted-special features). The server 118 can also receive information which uniquely identifies each gaming machine including a machine ID number and a current game being played on the gaming machine. The accounting information can be used for auditing purposes.

The player tracking system portion of server 118 can track the game play of individual users. For example, a player can input account information into one of the gaming machines that is associated with a player tracking account that has been previously set-up. Based on the account information, a particular player tracking account can be located. The player tracking account can include information which identifies an individual user, such as user or player 28 The player tracking account information can include a player's name, address, phone number, gender, etc. It is to be understood that the graphics presentations on any given gaming machine can be structured for entertainment and heightened emotions and/or expectations of not only the primary player 28 but also for that of nearby other persons.

In one embodiment, a player, such as user 28, can insert a player tracking card in a card reader (e.g., sec card reader 78 in FIG. 1A). The card reader can read player tracking account information from the player tracking card, such as on a magnetic strip on the card, and send the information to the player tracking/slot account system server 118. Based upon the received player tracking account information, the player tracking system portion of server 118 can locate a player tracking account.

The player tracking account information can be input via other means on the gaming machine. For example, as shown in FIG. 1A the gaming machine 10 may be able to communicate with a mobile device. Thus, in one embodiment, the gaming machine 10 may be configured to directly receive player tracking account information from a mobile device. In another embodiment, the gaming machine 10 may be configured to generate an input interface on a touch screen display that allows a player to input player tracking account information.

After the player provides account information and an account is located, the player tracking system can enter accounting information associated with a player's game play into the identified player tracking account, such as an amount wagered over time. As described above with respect to FIG. 1, the accounting information associated with a player's game play can provide a basis for awarding comps to the player. For example, based upon a player's previous game play, the player tracking system portion of server 118 can send an amount of credits to the gaming machine on which the player is playing. In another example, the player tracking system portion of server 118 can send a command to a printer 78 on the gaming machine 10 on which the player is playing to print out a ticket. The ticket can be redeemable for goods or services or a discount on goods or services, such as a free meal or discount a meal.

As described above, each of the gaming machines can be coupled to a ticket-in/ticket out (TITO) server 114. TITO server 114 can be used to generate and validate instruments associated with a credit and/or cash value. One example of an instrument, which can be generated and validated, is a printed ticket. Another example is a digital instrument, such as a printed ticket stored in a digital form. In one embodiment, a digital instrument can be stored on an electronic device carried by a user, such as a mobile device carried by user 28.

As an example, when a printer, such as 78, is employed in a "cash out," the gaming machine controller (e.g., see GMC 24 in FIG. 5) can contact a TITO server (e.g., see 114 in FIG. 2) with a cash out amount. In response, the TITO server can generate a unique number, associate the unique number with a value and send the gaming machine a unique number. The unique number can be sent to a printer (e.g., see printer 78 in FIG. 1A). Then, the printer can print a ticket with the unique number, such as a unique number encoded in a bar-code, and a value of the ticket, such as five dollars.

When the ticket is later presented for redemption, the unique number can be used to validate the ticket. For example, the user 28 can "cash out" at a first gaming machine, such as 1064 in bank 126A, and receive a printed ticket with a unique number generated by the TITO server 114. Then, the user 28 can go to a gaming second gaming machine, such as 1066 in bank 126C, and insert the ticket into a bill acceptor (e.g., see 80 in FIG. 1A). The second gaming machine 1066 can contact the TITO server 114 and send the ticket information, i.e., the unique number read from the ticket, to server 114. Then, the server 114 can validate the ticket and send back to the second gaming machine 1066 an amount of credits to deposit on the second gaming machine. The deposited credits can be used for additional game play.

In these examples, the servers can include processors, memory and communication interfaces. Various gaming functions are associated with each of the servers, 120, 122, 124, 118 and 114. The described distribution of gaming functions is for the purposes of illustration in only. In alternate embodiments, combinations of gaming functions can be combined on the same server or repeated on different servers. For example, the central determination server 120 can also be configured to provide a local progressive to the bank of gaming machine 126A. In another example, the local progressive server 122 can be configured to provide a number of different progressive prizes for different groups of gaming machines. In yet another example, the player tracking system portion of server 118 can be configured to provide bonusing features at each of the gaming machines.

In FIG. 2A, while gaming machines, such as those of displays 1064 or 1066, are operational, a player 28 can engage in game play. Under some conditions, such as tilt conditions, game play can be suspended and an intervention by a casino-authorized operator, such as 106, may be required. An operator intervention may require an operator, such as 106, to be directly present at a gaming machine, such as that of display 128. For example, the presence of an operator may be required to access an interior of the gaming machine to clear a tilt condition. In other examples, an operator may be able to clear a tilt condition from a remote location via a near field or other communication coupling with the gaming machine (e.g., using a mobile device). One reason for requiring physical presence of casino-authorized operators (e.g., 106) whenever the interior of a gaming machine (or of another gaming controller) is accessed is so as to provide an audit trail of who accessed what machine when and for what allegedly purposes. Typically, there will be overhead video cameras watching the casino floor and recording all activities including that of various personnel accessing the interiors of respective gaming machines and/or gaming controllers. Direct remote reconfiguration of gaming machines and/or gaming controllers is not permitted at least in certain circumstances.

In one embodiment, during game play, the gaming machine can award an amount above some threshold amount. Prior to receiving the award, an operator, such as 106, can be sent to the gaming machine to have the player fill out a form for tax purposes. In the United States, this tax form is referred to as a W2G form. In addition, the operator may verify that the gaming machine was operating properly when the award was made prior to the player receiving the award. For example, if the gaming machine indicates a progressive jackpot has been won, the operator may check to verify the gaming machine was operating properly. In a hand pay, the operator, such as 106, may provide an instrument redeemable for the jackpot amount.

As described above and in more detail with respect to FIGS. 1A, 2A, an operator 106, may be required to be physically present at a gaming machine, such as 1064 and 1066, to clear a tilt condition. For example, to clear a tilt condition, the operator, such as 106, may have to access an interior of a gaming machine to clear a paper jam in a printer or a bill acceptor (e.g., sec printer 78 and bill acceptor 80 in FIG. 1A). In another example, to clear a tilt condition, the operator 106 may have to access an interior of the gaming machine, such as 1064, to add more tickets to a ticket printer or empty a note stacker associated with the bill acceptor. For some tilt conditions, the gaming machine operator 106 may access a menu output on a main display 22 of the gaming machine 10, to perform a RAM clear. RAM clears are described in more detail below with respect to FIG. 5.

Electronically-assisted games of chance, including those involving special feature symbols and boosted-features areas have been discussed herein. With respect to the chance providing mechanisms used in such games, it is to be understood that such can include not only mechanical chance providing mechanisms (e.g., mechanical spinning wheel with relatively unpredictable stop position), but also electronically based chance providing mechanisms that can be implemented in the form of digital and/or analog electronic circuits. Such circuits may rely on flip-flops or registers designed with intentional meta-stability and/or on noise intolerant switching circuits that are intentionally exposed to random noise (e.g., thermal noise) so as to provide relatively random and unpredictable outcomes. In one embodiment, an automatically repeatedly actuated code/data verifier is called upon to verify that utilized software and control data use pre-approved hardware, firmware and/or software for properly providing random chances of respective predetermined probabilities at winning and or getting a chance to spin for respective prizes including for respective progressive jackpot pools (e.g., mega-, medium and/or mini-jackpots). Prior art technologies for truly random or pseudo-random picking of outcomes from respective finite outcome sets are too numerous to mention all here. Examples of Random Number Generation (RNG) include Oscillator controlled RNGs, Linear feedback shift register based RNGs; RNGs using Plural parallel outputs bits; Seed value controls for RNGs; Truly random number RNGs; RNGs with Plural parallel outputs, etc. More specific examples of RNGs are provided for example in U.S. Pat. No. 9,830,130 (Random number generator); U.S. Pat. No. 9,792,089 (Random number generator using an incrementing function); U.S. Pat. No. 9,778,913 (Method of generating uniform and independent random numbers); U.S. Pat. No. 9,640,247 (Methods and apparatuses for generating random numbers based on bit cell settling time); US Patent Publication 20170262259 (Method for Generating Random Numbers and Associated Random Number Generator); PCT/EP2017/069185 (Quantum Random Number Generator and Method for Producing a Random Number by Means of a Quantum Random Number Generator). A simple example of an RNG is a high speed asynchronous oscillator (e.g., GHz range) driving a wrap-around counter whose counting is stopped or captured by an asynchronous event of substantially slower and unsynchronized timing resolution (e.g. a user pushes a button, background noise is detected, etc.). The output of the stopped/copied counter may then drive an address input of lookup table populated by predetermined outcome values (e.g., playing card symbols) at their respective outcome frequencies. A particular outcome is thereby picked in a substantially random and optionally statistics skewed manner (skewed by the LUT) based on its frequency of appearance within the lookup table.

Figure 4:
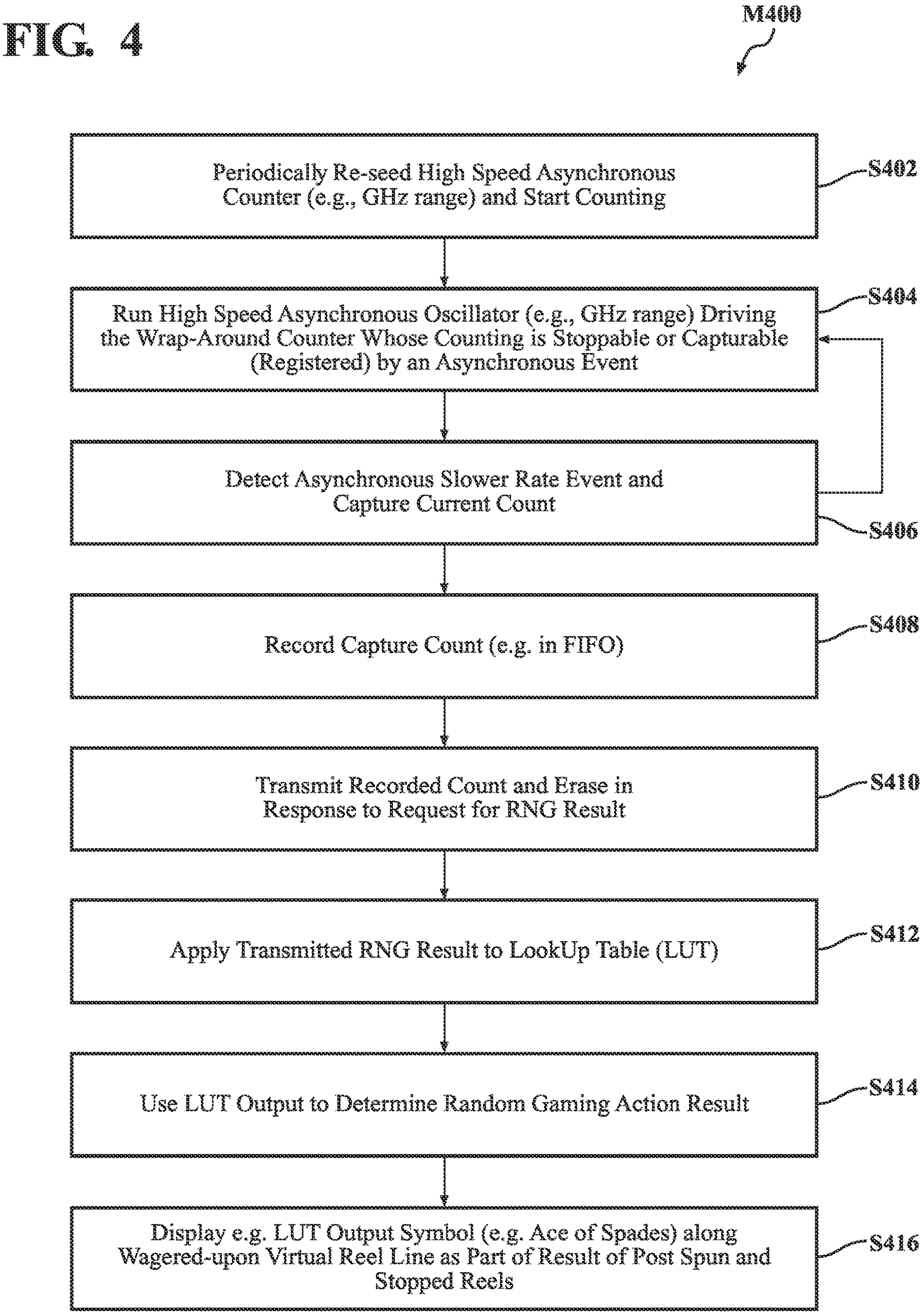
FIG. 4 illustrates a random number generation method.

Referring to FIG. 4, shown as a non-limiting example is a method M400 of using a random or pseudorandom number generator (RNG) for determining gaming action outcome. At step S402 a counter initializing value is determined as a seed for starting up a wrap-around digital counter driven by a high-speed oscillator. In one embodiment, a pseudorandom generator selects a subset of digits of the system real time clock. The selected digits are combined (e.g., summed) with a predetermined name seed and selected environmental noise measurement (e.g., background radio noise) to form the counter initializing seed. Then at step S404, the seeded counter begins its wraparound count while driven by a high-speed asynchronous oscillator (e.g., one operating in the GHz range). The counter may be a linear counter or a gray coded counter or account or otherwise wired for generating pseudorandom sequences.

At step S406, an external event that occurs asynchronously at a substantially slower rate (e.g., much slower than in the GHz range) is detected and used to trigger a register which captures the current counter value. The register captured value is stored in a temporary and secure memory such as a first-in first-out register (FIFO) (S4408). In one embodiment, the FIFO is a circular one of limited size whereby unused recorded counts are overwritten by newly captured random count values. At step S410 a request is received for an orangey result and in response the count value at the output end of the FIFO is transmitted to the requester. The transmitted count value is erased from the FIFO.

In step S412 the relatively random RNG result value is applied to a statistics skewing look up table (LUT). The statistics skewing LUT differentially maps various ones of the input random numbers into respective output values or output symbols. Output values/symbols that are to have higher frequencies of occurrence are mapped to more of the input random numbers while values/symbols that are to have lower frequencies of occurrence are mapped to fewer ones of the possible input numbers. For example, in one embodiment the possible output symbols are the fifty-three possible cards in a normal playing card deck. The possible input number set may have thousands of unique members. At step S414, the output of the LUT forms at least part of the gaming action outcome. For example, the LUT output may represent an Ace of spades card. Plural an independent RNG's and LUT's may be simultaneously used for generating respective parts of a gaming action outcome having plural parts (e.g., a five card poker hand). At exemplary output step S416, the symbol represented by the LUT output is displayed for example along a wagered upon line of a set of virtual reel's that are first virtually spun and then slowed to a stop which settles on the predetermined gaming action outcome. Preferably, the RNG's and their associated LUT's are disposed in a secured central enclosure where the graphics for the gaming action are also generated and the graphics are transmitted by secure communication links to the local gaming machines in the respective banks.

Referring next to FIG. 5, details of a gaming machine controller that may be used to control the play of wager-based games (e.g., progressive pool games) including generating the game presentations and controlling the various gaming devices is described. FIG. 5 illustrates a block diagram of gaming machine components including a securely housed gaming machine controller (GMC) 24. The GMC 24 can be coupled to the power supply 16, the display 22, I/O devices 130, external non-transient memories, such as a disk drive 132, a power-off security device 134, the security sensors 86, communication interfaces 136 and meters 138. In one embodiment, the communication interfaces 136 of the GMC include one or more wired USB receptacles into which a T-commands providing USB storage device may be removably plugged in.

The power supply 16 can provide a DC voltage to the GMC 24. The power supply 16 can also provide power to the other devices in the gaming machine cabinet 12, such as the I/O devices 130. Typically, the power supply 16 is configured to receive power from an external power source, such as an AC voltage source. In some embodiments, an uninterruptable power supply (UPS) 140 can be coupled to the power supply 16. The UPS 140 can be configured to provide back-up power for some time period in the event external power is lost. The GMC 24 includes its own internal and thus securely housed battery 142 (e.g., a rechargeable battery).

In a particular embodiment, the UPS 140 communicates with the GMC 24 on boot up and periodically to indicate power status and battery capacity of the UPS. If the UPS 140 is not operational, this communication will fail and the game will display a soft tilt on the main game display, such as 1018', indicating that the UPS is not available. Under normal circumstances the UPS 140 functions to condition the input power and ensure that the UPS battery remains fully charged. However, upon a power failure, the UPS 140 in conjunction with the game platform will take one of two paths depending on the state of the UPS battery, which are described as follows.

If a power fail occurs and the UPS battery is more that 50% charged the GMC 24 can immediately determine if there are credits on the machine (The threshold level can be a different percentage). If the game has no credits, the GMC 24 can immediately hard tilt and become unplayable. The GMC 24 can continue to run on battery power until either the battery level passes below 50% or power is restored to the game. If power is restored, the hard tilt is cleared and the gaming machine can become playable again.

If credits are on the machine, the GMC 24 can allow game play to continue until the battery level reaches 50% charge. At that point, the GMC 24 can complete a game in progress, cash out the player and begin an orderly shutdown. Allowing game play prior to shutting down allows the player to complete a game in progress and continue to remain on the game for a small period of time in case power is restored quickly. This keeps the game from tilting and the GMC 24 cashing out the player for momentary glitches in power. It also allows some time for backup generators to come on line for a more serious power outage.

The power-off security 134 can be configured to monitor the security sensors 1140 while power is off to the gaming machine, such as during a power failure or shipping. The power-off security 134 can include its own processor, memory and power supply, such as the internal battery 142. The power-off security device 134 can report detected problems while the power was off to the GMC 24 after power is restored. In some instances, a detected problem can cause a tilt condition. For example, a detected door open condition while the power was off may cause a tilt condition which has to be cleared by an operator. As another example, if the GMC 24 can't detect the power-off security 134, then the gaming machine can tilt.

The I/O devices 130 can include the gaming devices that are directly or indirectly coupled to the GMC 24 to provide the external interfaces that allow players to play the wager-based game(s) on the gaming machine. Examples of these gaming devices are described above with respect to FIG. 1A. In some embodiments, the memory 20B may in the form of a disk drive and/or a flash drive, can be provided. As will be described in more detail below, the memory device 20B can be used as a power hit tolerant memory (PHTM) or used to receive crucial data from another PHTM.

The communication interfaces 136 can include wired and wireless communication interfaces, which use communication protocols, such as but not limited to Ethernet, Bluetooth, Wi-Fi, and NFC. A schematic indication of such a wireless communication interface 1046 is shown in FIG. 1A. The remote servers (e.g., each server including one or more data processing units such as CPUs and appropriate memory such as SRAM, DRAM, Flash etc.) can form and provide the network services 104 as described above with respect to FIG. 1A. The communication interfaces can be used to communicate with remote devices, such as remote servers, mobile devices in proximity to the gaming machine or other gaming machines. The GMC 24 can be configured to support a variety of communication protocols over these communication interfaces.

In one embodiment, communications can be carried out with a back-end slot accounting system (SAS) (e.g., see network services 102 in FIG. 1A). In one embodiment, the SAS protocol uses a CRC redundancy check to ensure the integrity of messages going to and from the host. All type S, M, and G Long polls are checked over the entire package including the address and command byte. The SAS engine can be configured to isolate the gaming code from the external communications. The SAS engine can be configured to only accept correctly formed SAS messages. Malformed, invalid or incorrect messages can be summarily dropped. Although CRC is mentioned here as one basis for data integrity validation, it is within the contemplation of the present disclosure to use of numerous other data and code integrity validation techniques including, but not limited to, the above described hash matching technique.

Messages that are valid can be translated into requests for the game player. The result of the message translation can be two-fold. First, the message is parsed and then evaluated for correctness and validity. If the message does not meet this criterion, it may not be translated and forwarded to the game player for a response on the display 22 (or secondary or alternative display). Second, no command, request or message from the external communication interface ever reaches any further than the SAS engine. This process ensures that erroneous signals or data will not adversely affect the game.

The meters 138 can include hard meters, which are mechanical devices and meters maintained in software by the GMC 24. In one embodiment, electronic digital storage meters of at least 10 digits that accumulate and store all the meters required can be used. For example, the number of games played since a RAM clear can be accumulated. In a RAM clear, critical memory can be cleared of data. Further, the number of games since the last power-up can be accumulated. As another example, games since the last door close can be accumulated.

Some other functions which may be tracked by a physical or software meter include but are not limited to attendant paid jackpots, attendant paid cancelled credits, bill in, voucher in (e.g., credit voucher), voucher out, electronic fund transfer in, wagering account transfer in, wagering account transfer out, non-cashable electronic promotion in, cashable electronic promotion in, cashable promotion credits wagered, non-cashable electronic promotion out, cashable electronic promotion out, coupon promotion in, coupon promotion out, machine paid external bonus payout, attendant paid external bonus payout, attendant paid progressive payout, machine paid progressive payout, non-cashable promotion credits wagered, number of progressives won, number of jackpots won, number of games won, number of games lost and total amount paid by attendant. Other meters can include main door open, logic door open, cash door open and stacker door open.

In a particular embodiment, software meters can be accessed from an operator menu by turning a key on the side of the gaming machine. The operator menu can be output on the display 22 or an alternative display. All software meters can be cleared upon a RAM clear. In addition to the meters, the machine can also display the configured denomination, theoretical payout and actual payout. This information is accessible from the operator menu under the statistics screen. This information can be cleared upon a RAM clear event.

The GMC 24 is preferably mechanically secured within an interior of the gaming machine. For example the GMC 24 can be contained in a metal box. The metal box can include a secure entry, such as a hinged door, that is lockable. The openings for cables and wiring in the metal box can be purposefully designed to be as small as possible while still allowing proper electrical wiring standards regarding bend radius and connector strain. The locking mechanism for the metal box can be monitored by one of the sensors 86.

The GMC 24 can include a motherboard. The motherboard can be the only circuit card that contains control programs. The control programs include those used to control programmable operations within the GMC 24. Other gaming devices, such as the I/O devices 130, can include device specific control programs. However, these device specific control programs don't affect or alter the behavior of the control programs on the motherboard. In one embodiment, the control programs are hash protected at install time per the above described techniques and then automatically repeatedly verified periodically or on other event driven bases.

The mother board can include a chipset 144. The chipset 144 can include a Northbridge 146, which is a memory controller hub, and a Southbridge 148, which is an I/O controller hub. The Northbridge 146 and the Southbridge 148 can communicate via an internal bus 150.

The Northbridge 146 can be coupled to a memory bus 152 and a front side bus 154. The front side bus 154 can couple on or more processors, such as CPU 26, to the Northbridge 146. The CPU 26 can receive clock signals from a clock generator 174 via the front side bus 154.

The memory bus 152 can couple one or more graphics cards, which include graphical processing units (GPUs), to the Northbridge 146. The graphics card or cards can be installed in the graphics card slot(s). The graphics cards can be coupled to the display 22 and any secondary display. Further, the memory bus 152 can couple one or more memory slots 156, configured to receive volatile random access memory, to the Northbridge 146. The processor or CPU 26 can communicate with the volatile memory in the memory slots 156 and the graphics card in the graphics card slot 172 via the memory bus 152 and the front side bus 154.

The Southbridge 148 can be coupled to one or more PCI slots 158 via PCI bus 160. In various embodiments, the Southbridge 148 can provide a variety of communications interfaces. The communication interfaces include but are not limited to IDE, SATA, USB, Ethernet, an audio Codec and CMOS memory. In addition, the Southbridge can communicate with a flash ROM (BIOS) 162 and super I/O 164 via the LPC (Low Pin Count) bus 1152. Typically, super I/O 164 supports older legacy devices, such as a serial port (UART), a parallel port, a floppy disk, keyboard and mouse. Some of the gaming devices, such as the sensors 1140, can be coupled to the Southbridge 148 via super I/O 164.

The GMC 24 can be configured to execute the game software 166 to control playing of a respective one or more wager-based games. On boot-up, a self-bootstrapping check of basic hardware, firmware and software integrity 168 can be performed using firmware logic driven by the BIOS 162. In a particular embodiment, an isolated and separate hardware device can be installed which includes the boot-up checking algorithms for the basic hardware, firmware and software integrity. The separate hardware device can be coupled to the Southbridge 148.

In one embodiment, the game software 166 can be stored on two compact flash cards, which are not conventional ROM devices. The verification mechanism can use one or more SHA-1 hashes, which produce a message digest of some length, such as one hundred sixty bits. Message digests can be stored on both compact flash memories. A public/private key covered and/or symmetric key covered algorithm with a key of some length, such as a 512-bit key can be used to encrypt and decrypt the message digests. If any errors are detected in the validation of the game software 166, the GMC 24 can automatically switch to a tilt mode and halt execution of gaming actions. The GMC 24 can be configured to prevent programs deemed to be invalid (e.g., those failing periodic verification checks) from running.

When the game software 166 is compiled and built, one or more of its respective code and/or data segments can be hashed using a hash algorithm, such as the SHA-1 hash algorithm. Other hashing algorithms can be used and SHA-1 is mentioned for illustrative purposes only. The resulting hash answers can form the hash digest. This digest, along with the start and stop values for the validation algorithm, can be encrypted by a private key. The key can be stored in a computer which is not connected to any network, and which is physically stored in a secure location, such as a locked safe. Alternatively, or additionally the above described, secure encrypted SQL database may be used for assuring that decryption keys and/or procedures are not tampered with prior to validating the installed code and/or data segments.

In one embodiment, prior to use, the public key can be installed in a power-hit tolerant memory, such as the NVRAM 170 on the motherboard. This step can be performed when the gaming machine is manufactured. In another embodiment, the corresponding public and/or symmetric keys can be loaded from a secure mobile memory device, such as an authentication compliant USB device, in the field. In one embodiment, the USB port is only accessible when the enclosure which holds the GMC 24 is opened. Without a proper public key, the machine will not operate.

When the game initially powers up, the BIOS 162 can run a Power On Self-Test (POST) and checksum over itself and/or perform other boot-strapping integrity self-checking. If these tests fail, the game does not boot and an operator can be required to clear this tilt. If the BIOS self-test passes, the BIOS can retrieve the public key from NVRAM 170 and can run a CRC over the retrieved key to ensure it is the correct key. The correct CRC answer can be stored on the BIOS. If the public key does not exist or if the public key CRC returns an incorrect answer, the game can halt and prompt the user to install the correct public key.

Once the public key is validated, the BIOS 162 can test the integrity of the code stored in the system compact flash 166 by using the validated public key to decrypt the SHA signatures for the data stored on the system compact flash 166 and the start and stop sector identifiers indicating where the respective segments of data are stored on the compact flash for each corresponding SHA signature. The data can be stored between the start and stop sectors, inclusive. Unused sectors can be set to 0 (zero). The BIOS 162 runs a low-level block-by-block integrity check using one or more SHA-1 hashes over the kernel and operating system (Boot and Root) partitions and compares the result to the decrypted file from the manifest. In one embodiment, the operating system can be Linux and the kernel can be a Linux kernel. If any of the hash values does not match, the game automatically goes into tilt mode.

If the values match, the BIOS 162 can load the now-validated boot loader program and can relinquish control of the validation process to the boot loader. The boot loader can be executed by the operating system using CPU 26. The procedure can validate the entire partition, not just the file structure. Thus, any unused or unallocated areas of the partition can be tested for unintended programs or data.

Next, a file-by-file SHA-1 verification (or other hash based verification) can be performed over the paytable, assets, and player files. The resulting information can be compared against the decrypted results from the manifest file and/or from the secure encrypted database server 108. If the calculated answers match the decrypted answers, the GMC will proceed with the boot-up. If the hash answers do not match, the game tilts and requires operator intervention to clear.

In one embodiment, as an additional security measure, a compressed file system that is designed to be read-only can be used. The file system may not support or contain a write command or the ability to write to a file. The file system can be compressed so that it is not human-readable.

Each block of data in the file system can have a corresponding CRC stored with the block. When the block is read, the CRC is calculated and compared with the stored CRC. If the answer does not match, the file system can generate an error and the game tilts. Any changes, whether additions, deletions, or modifications, will change the CRC of the affected blocks and cause the game to tilt. This feature, in effect, monitors the integrity of the entire file system as well as the integrity of the media on a real-time basis. Although CRC is mentioned here as one basis for data integrity validation, it is within the contemplation of the present disclosure to use of numerous other data and code integrity validation techniques including, but not limited to, the above-described hash matching technique.

The SHA hash answers can be available on-screen and may also be accessed via the Gaming Authentication Terminal (GAT) interface. The GAT interface (not shown) can be provided as one of the I/O devices 130 or within the super I/O 164. The GAT interface can be configured to allow an operator to initiate an SHA-1 hash or an HMAC SHA-1 on-demand so that an operator (or other independent entity) can validate the integrity of the software 166 at any time. In one embodiment, a nine-pin “D” connector is available to an operator or regulator (e.g., government authorized inspector) for access the GAT serial terminal.

Access to the GAT port requires the opening of the main door. Further, it may require unlocking of the GMC enclosure. In one embodiment, a GAT port can be provided on the outside of the GMC enclosure. Hence, the GMC enclosure can remain locked while the GAT port is utilized.

As described above, the gaming machine can include a power hit tolerant memory (PHTM). For example, NVRAM 170 (nonvolatile memory, for example a RAM coupled to battery 142) can be used as a PHTM. The PHTM can be used to store crucial data, such as data generated during the play of a wager-based game. The PHTM can be configured to be able to quickly write the crucial data in response to a detection of an imminent power interruption. The CPU 1102 can be configured to detect a potential power interruption via the power interruption signal received from the power supply. The power interruption signal can indicate a fluctuation in the power.

Not all memory types may be suitable for use as a PHTM because their write times are not fast enough to store data between the detection of a potential power interruption and the power interruption. For example, some disk drives don’t typically have fast enough write times for use as a PHTM. In one embodiment, a disk drive 132 can be used. However, it requires that use of an uninterruptable power supply coupled to the disk drive 132 and GMC 24 to maintain power after the external AC power source is lost. Other types of memory with slower write times can be employed when an uninterruptable power supply is used.

Typically, a volatile RAM (random access memory) has a fast enough write speed to be used as a PHTM. However, after the power is lost, data stored in the volatile RAM is lost. To overcome this deficiency, a rechargeable battery, such as 142, can be coupled to the RAM 170 to provide persistence memory storage. This memory configuration can be referred to as a non-volatile RAM (NV-RAM). The battery power levels can be monitored so that it can be replaced as needed if it is no longer rechargeable. Alternatively, or additionally, other forms of nonvolatile memory can be used including for example flash memory, phase change memory, etc.

In one embodiment, an NVRAM 170 with a battery 142 is shown inserted in one of the PCI slots 158. The NVRAM 170 can be used as a PHTM. In other embodiments, it may be possible to use a RAM inserted into one of the memory slots 156 that is coupled to a battery. It yet another embodiment, it may be possible to use a high-speed USB connection to a memory storage device to provide a PHTM. As noted above, a hard disk, such as 132, in combination with an uninterruptable power supply 140 can be used as a PHTM.

In yet other embodiments, a GMC 24 may utilize multiple memory storage devices to store crucial data. For example, the NVRAM 170 can be used as a PHTM. However, crucial data can be copied to a non-PHTM from the NVRAM 170 as needed. The copied data can provide a back-up of crucial data stored in the PHTM. Further, after crucial data is copied from the PHTM and the validity of the crucial data is verified, it may be deleted from the PHTM to free up space.

In one embodiment, crucial data can be stored in an NVRAM chip and in a high speed read/write compact flash. Crucial data such as RNG outcome, game recall, game state (credits, wager, winnings), and meters can be stored in NVRAM as files. Each file is hashed (MD5 or SHA-1 depending on the file) and the hash answer can be stored with the file and/or stored in encrypted form in the secure encrypted database server 2050.

Additionally, in a particular embodiment, in NVRAM, the critical files can be kept in triplicate with each copy having a separate MD5 hash of the information. Prior to displaying each game outcome, this data can be rehashed and the three outcomes can be compared. If all three hash answers match, the data is deemed to be good and the game results are displayed to the player and a copy is stored in NVRAM. If two of the sets match, the non-matching set is deemed to be corrupt and it is replaced with a copy from one of the other two and the results are displayed to the player. If all three are different, memory can be deemed to be corrupt and a tilt can occur, halting play. The comparisons can occur continuously, each time the memory is updated, which may be multiple times during the course of a single play. However, a comparison can be performed at least once prior to displaying the game outcome.

To protect meters in the event of a power loss, various meters can be stored in NVRAM 170. Thus, the meters are protected in the event of a power loss. The battery 142 can be a lithium cell rated, based on the current draw of the NVRAM, to maintain the meters for at least 90 days. In one embodiment, the lithium cell can be rechargeable via the power supply 16.

In particular embodiments, a game play history associated with recent games can be stored in the NVRAM 170. This information can be retrieved from the NVRAM 170 via an operator menu and output to the display 22 or a secondary display. In particular embodiments, a complete play history for the most recent game played and the nine prior games can be made available. A method involving game play history is described in more detail with respect to FIG. 9.

For a slot game, the game play history can include credits available, credits wagered, number of lines played (when appropriate), bonuses won, progressive won, game winnings (credits won) and credits cashed out. For "pick" bonuses, the intermediate steps involving the player picks can be retained. In games with free spins, the initiating game is retained with all or, for cases where more than fifty free games have been awarded, at least the last fifty free games played. This gaming information can be displayed in the recall screens through standard text meters, screen shots, graphical display elements and textual representations of specific situations that occurred during game play. The game play history can illustrate unique game play features associated with the game in general and specific game features that occurred during the instantiation of a particular play of the wager-based game.

Figure 6:
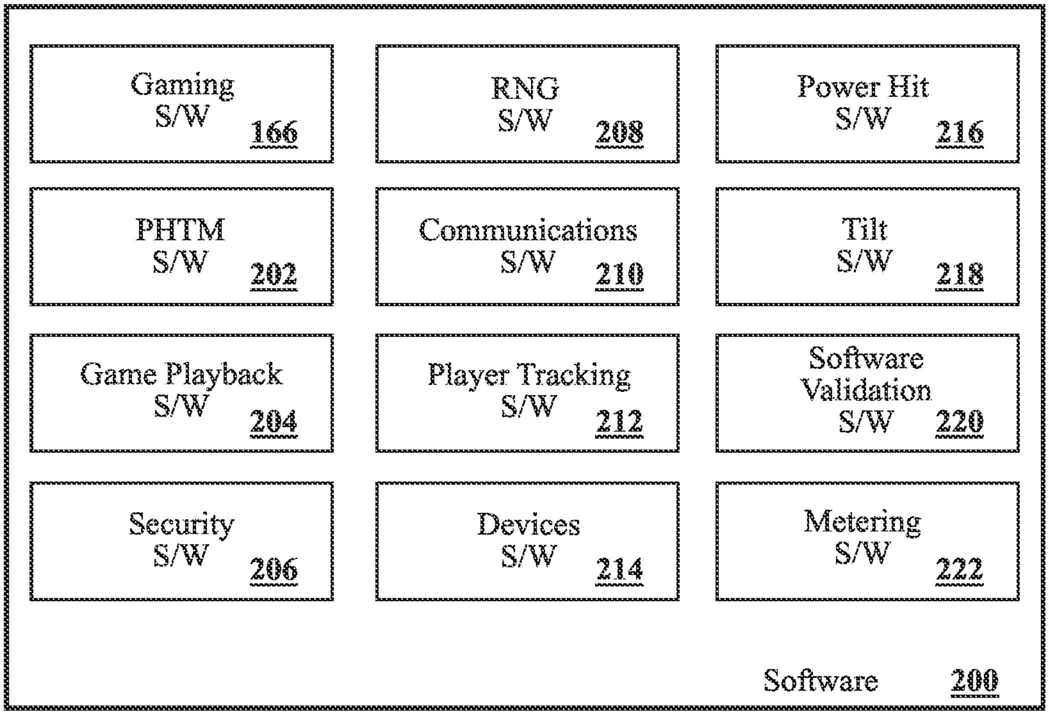
FIG. 6 illustrates a block diagram of game software in accordance with the present disclosure.

A gaming machine controller configured to generate a wager-based game in accordance with player selected volatility parameters is described with respect to FIG. 6. Game software used to generate the wager-based game is discussed with respect to FIG. 6. With respect to FIG. 7, a power hit tolerant memory configured to store crucial data generated from playing the wager-based game is discussed. The crucial data can include information associated with selected volatility parameters and wager-based games generated using the selected volatility parameters.

Figure 8:
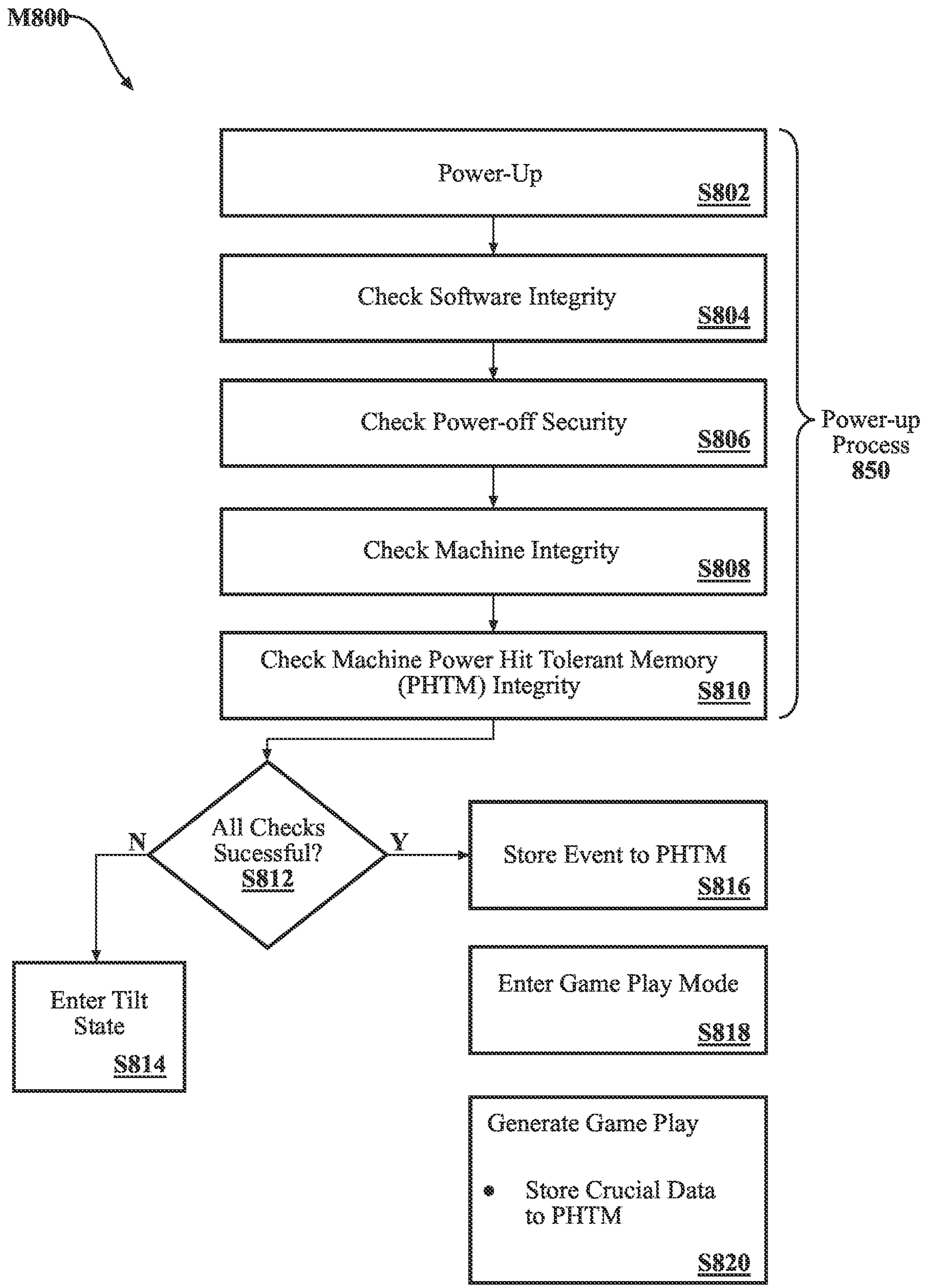
FIG. 8 illustrates a method for responding to a power interruption on a gaming machine in accordance with the present disclosure.

With respect to FIG. 8, a method for responding to a power interruption on a gaming machine, which utilizes the power hit tolerant memory, is discussed. With respect to FIG. 9, a method of powering up a gaming machine is described. Finally, with respect to FIG. 10, a method playing back a game, such as a wager-based game including a first primary game and a second primary game, previously played on a gaming machine is discussed.

FIG. 6 illustrates a block diagram of examples of software 200 that can be executed by a Gaming Machine Controller (GMC) 24 in FIG. 5B. The software 200 may include the game software 166 configured to control the play of the game. In the illustrated embodiment, the software 200 may also include: PHTM software 202, game playback software 204, security software 206, RNG software 208, communications software 210, player tracking software 212, devices software 214, power hit software 216, tilt software 218, software validation software 220, and metering software 222.

The play of the game includes determining a game outcome and award associated with the game outcome using the RNG software 208.

The game software 166 can be configured to utilize reel strips and/or wheels of chance with different properties. For example, virtual reel strips with different total number of symbols, different symbol combinations and different stopping probabilities. As described above, the game software may utilize different virtual reel strips in response to a selection of different prize structures involving scatter distributed symbols.

The award can be presented as a number of different presentation components where a portion of the award is associated with each presentation component. These presentation components can be referred to as game features. For example, for a video slot game, game features can involve generating a graphical representation of symbols moving, settling into final positions and lining up along a combination of different lines (e.g., paylines). Portion of the award can be associated with different lines. In another example, the game features can involve free spins and chance award of bonus wilds during the free spins. In yet another example, the game feature can involve generating a graphical representation of symbol and then actuating a mechanical device, such as wheel to indicate an award portion.

In a further example, a game feature can involve a bonus game where a portion of an award for a game is presented in a separate bonus game. The bonus game can involve inputting choices, such as a selection of a symbol. Similar to the primary game, the bonus game can include bonus game features where bonus game award is graphically presented in a number of different portions. A primary game can include game features which trigger different bonus games with different bonus game features.

As described above, game features and bonus game features can be stored to a power hit tolerant memory (PHTM). The PHTM software 202 can be configured to manage the transfer of crucial data to and from the PHTM. Further, as described above, the PHTM software 202 can be configured to verify the integrity of the data stored in PHTM.

In particular embodiments, the game software 166 has no knowledge of PHTM. Thus, the utilization of the PHTM can be totally abstracted from the game software 166 and contained in a shared object that is loaded at runtime. This shared object will also determine if the PHTM is available and how much memory space is available. If there is no PHTM, or it doesn't contain enough memory, the shared object can be configured to automatically use a disk file instead. This function may allow the game to be run in a windows environment and still have the ability to recover from a power hit.

One purpose of the PHTM 202 is proper recovery from a power hit. In order to facilitate proper power hit recovery, numerous transition points can be built into the game software 166 where crucial data is stored to PHTM at each transition. The transitions can be implemented as states, which can be referred to as game states or game state machines. The states themselves can also be stored in PHTM so that on startup, after validating that the PHTM is not corrupt, the game software 166 can then check the current state that is stored. That state will then determine where the game will restart. The idea is that whenever a state transition occurs and is saved, the data needed to recover to that state has also been stored in PHTM.

Different approaches can be used in deciding when to save data to PHTM. In one embodiment, a thread runs in the background that constantly checks the data in memory against a copy of what's in PHTM as well as a force write flag. If the force write flag has been set or if it sees that the crucial data has changed, PHTM software 202 writes it to the physical PHTM, updating the copy as well.

In another embodiment, the PHTM software 202 can be configured to write all data directly to PHTM as it occurs. At certain times the PHTM software 202 can be configured queue writes rather than committing them in order to make it an "all or nothing" write. This feature can be normally done for something that is going to cause a state change, a cash-out, etc. This feature can allow all the meters or crucial data associated with the game to be written at once, keeping the window of opportunity for corruption to the smallest amount of time possible.

In particular embodiments, multiple state machines can be used that are based on the overall game state machine. For example, separate "sub-state machines" can be used for critical functions that use external I/O devices, such as bill acceptors and printers. If the game software 166 restarts in a state that requires more granularity and has a different state machine such as a cash out or a ticket inserted state, it can switch to that sub-state machine to complete the actions and then return to the overall game state machine.

In particular embodiments, the sub-state machine concept can be used for areas of the game that are outside of the main game flow such as bonus games. For example, if the game is in a bonus game with bonus game feature including a free spin bonus round and the power cycles before all of the free spins have finished, the game will recover to the spin that was being executed when the power cycled and will continue from there. If the game is in a bonus game during a bonus game feature including a pick bonus, the game software 166 can recover to the point where the power cycle occurred. In particular, the picks that have already been made can be displayed and then the bonus game can continue from that point including receiving additional picks. Further, the game software 166 may be configured using the crucial data stored in the PHTM to regenerate on the display all or a portion of the game states prior to the power hit, such as the initial state of the game and game states that occurred prior to the bonus game.

The game playback 204 can be used to display information associated with one or more game states of a wager-based game previously played on a gaming machine. As an example, a particular wager-based game can be initiated and played on the gaming machine. During game play of the particular game, crucial data associated with game states that occur can be stored to the PHTM. Subsequently, one or more additional games can be played on the gaming machine. Then, using crucial data recalled from the PHTM, game information associated with the particular game can be redisplayed on the gaming machine. The game information can include but is not limited to a) text information, b) screen shots that were generated during game play and c) a regeneration of all or a portion of a graphical game presentation associated with the particular game.

Typically, to access the gameplay back feature, the gaming machine has to be placed in a tilt mode where an operator menu is available. From the operator menu, using game playback software 204, an operator can select a particular game for playback from among a plurality of games previously played on the gaming machine. To resume normal game play, the tilt mode can be cleared and the gaming machine can revert to a normal operating state. More details of game play back are described with respect to FIG. 10.

The security software 206 can be configured to respond to information received from various security sensors disposed on the gaming machine and from the power-off security device (e.g., see 134 in FIG. 4). For example, the security software 206 can be configured to detect that a locking mechanism has been actuated on the gaming machine and then cause the gaming machine to enter a tilt mode. As another example, the security software 206 can be configured to receive information from the power-off security device that the gaming machine door was opened while the gaming machine was being shipped. In response, the security software 206 can cause the gaming machine to enter a tilt state. In yet another embodiment, the security software 206 may not be able to detect a sensor, such as a sensor (e.g., see sensors 1140 in FIG. 5B) which monitors a state of a door and in response, enter a tilt state.

The RNG software 208 can be configured to generate random numbers used to determine the outcome to a wager-based game. In one embodiment, a Mersenne twister random number generator (RNG) algorithm, which generates integers in the range [0, 2 {circumflex over ( )}k−1] for k-bit word length with a period of (2{circumflex over ( )}19937)−1 can be used. It has a longer period and a higher order of equi-distribution than other pseudo-random number generators. The Mersenne Twister is also very fast computationally as it uses no division or multiplication operations in its generation process. It can work well with cache memory and pipeline processing.

In particular embodiments, the RNG cycles at seventy RNG cycles/second or above, such as equal to or above one hundred RNG cycles/second. This speed has been determined by engineers at the Nevada Gaming Control Board to be fast enough that it cannot be timed by the player. The tests showed that above seventy RNG cycles/second successfully hitting a specific outcome became sporadic, and the results were completely unpredictable at one hundred RNG cycles/second. An evaluation showed the variance in the contact mechanism of mechanical switches and the inherent variance in the "button press" detection circuitry, combined with the inability of a person to repeat a movement, provided enough ambiguity in the final registration of the button press to eliminate a player's ability to affect the payback characteristics of the game.

The RNG can be seeded using a plurality of variables. In particular embodiments, the RNG can be seeded by four variables that eliminate the same seed sequence from being used in more than one device, such as two gaming machines using the same RNG seed. The variables can be 1) absolute time, 2) time since the machine powered up, 3) machine number and 4) a random number from the kernel base RNG "/dev/urandom." The random number from the kernel can be associated with the Linux Kernel. This RNG "/dev/urandom" can be based on random occurrences, such as times between keystrokes, mouse movements, timing between interrupts, and hardware occurrences. These occurrences can be used to build and maintain an entropy pool.

The system protects against the same sequence in several ways. First, even if two games are powered on at exactly the same time, there is enough variability in the exact time that the time since power up should prevent any two games from having the same number returned from this function. Also, the "urandom" RNG is entropy based, and is self-seeded from environmental noise contained in the kernel, which makes it unlikely that two machines would ever have the same seed. Finally, the machine number (EPS number) is used as part of the seed. Because this number is used to uniquely identify the gaming machine on the floor, it should always be different from any other machine.

The communications software 210 can be used to provide communications via the various communication interfaces and using various communication protocols. For example, the communications software 210 can support the SAS protocol over wired or wireless communication interfaces. In another example, the communication software may allow the gaming machine to communicate with a mobile device via a wireless communication interface using a Bluetooth™ protocol.

The player tracking software 212 may allow the GMC to communicate with a player tracking device installed on the gaming machine and/or directly with a remote server which provides player tracking services. For example, a player tracking device can be configured to communicate a GMC to transfer credits to and from the gaming machine. In another embodiment, the GMC can be configured to receive player tracking information from a card inserted in a card reader (e.g., sec 1028 in FIG. 1) or via wireless communications with a player's mobile device. Then, GMC can communicate with a remote server to receive information associated with a player and send information associated with the player's game play on the gaming machine.

The devices software 218 may be used to allow the GMC to communicate with various devices coupled to the gaming machine, such as I/O devices coupled to gaming machine. For example, the devices software may allow the GMC to communicate with a bill acceptor (e.g., sec bill acceptor 80 in FIG. 1A) and in response add credits to the gaming machine. In another example, devices software may allow the GMC to communicate with a printer (e.g., see printer 78 in FIG. 1A) and in response cash out credits from the gaming machine in the form of printed ticket.

The power hit software 216 can allow GMC to respond to power hits. For example, the power hit software 216 can monitor the power supply and in response to a detection of power fluctuations update the PHTM with crucial data. In another example, when the gaming machine is power-up from a power hit, the power hit software 216 can determine the power hit occurred during game play and initiate a restoration of the gaming machine to its state when the power hit occurred.

The tilt software 218 can be configured to monitor sensors and gaming devices for tilt conditions. In response to the detection of a tilt condition, the tilt software 218 can cause the gaming machine to enter a tilt state. Further, the tilt software 218 can record tilt information to the PHTM.

For example, when a machine door open is detected, the game can tilt with a hard tilt that prevents play and disables the game. If the gaming machine includes a tower light, the tower light can flash to indicate that a door is open. Further, a "DOOR OPEN" indication can be displayed on the main display screen. Upon a detection of the door closing, the tower light can stop flashing and the "DOOR OPEN TILT" can be replaced with a "DOOR CLOSED SOFT TILT."

The door open tilt condition can be the behavior for all the machine doors, such as door 76 in FIG. 1 or a CPU enclosure door (not shown). Additionally, the behavior may not change for multiple doors that are open. Thus, the "DOOR OPEN" indication can remain on, and the machine will be disabled until all the doors are closed. After the final door is closed, the tower light can go off, the game can become playable and the "DOOR OPEN" indication can be written over by a "DOOR CLOSED" indication which will remain until the end of the next game cycle.

A number of tilts can be generated that must be cleared by an attendant. These tilts may include clearing the condition with a key switch or, for tilts such as "PAPER OUT," the tilt may clear automatically after the attendant has remedied the malfunction. A low battery for a PHTM (e.g., see NVRAM 170 in FIG. 4 or 202 in FIG. 5) can be indicated by a "RAM BATTERY" tilt.

A "PRINT FAILURE" tilt can occur when there is a failure to print a ticket. In response, a printer hard tilt error can be issued and the description will indicate that the printer is offline. The tilt can be cleared when the printer is brought back online.

A "PRINT MECHANISM/PAPER JAM" tilt can occur for a paper jam. The game can indicate the paper jam has occurred and the printer is off-line (e.g., see printer 78 in FIG. 1A). This tilt can be cleared by clearing the jam and reinserting the paper into the printer.

A "PAPER OUT" tilt can occur when the printer runs out of tickets (e.g., see printer 78 in FIG. 1). In response to detecting no remaining tickets, the game can display information indicating no paper is available and the game can be disabled. This tilt can be cleared when new printer stock is fed into the printer.

A defective storage media tilt can occur when an error is detected in a critical memory device, such as the memory storing the game software (e.g., sec 166 in FIGS. 4 and 6), the memory storing the BIOS (e.g., see BIOS 162 in FIG. 4) or the PHTM storing crucial data (e.g., see NVRAM 170 in FIG. 4). A message indicating the validation error can be displayed. This tilt may require a "RAM CLEAR" to remedy the tilt condition. A "RAM CLEAR" can erase all meter, recall and other critical memory.

As described above, multiple copies of crucial data can be stored in the PHTM (e.g., see NVRAM 170 in FIG. 4) and the GMC (e.g., sec GMC 24 in FIG. 4) can be configured to detect and correct copies of faulty data. When uncorrectable memory is detected in the PHTM or another device, it can result in a "CRITICAL MEMORY ERROR" tilt. Again, this tilt can require a "RAM CLEAR" to remedy the condition. Again, the "RAM CLEAR" can erase all meter, recall and other critical memory.

A "BILL JAM" can occur when the bill acceptor detects a bill jam (e.g., see bill acceptor 80 in FIG. 1). The tilt condition can be displayed on the display, such as main display 1018 in FIG. 1A. This is a hard tilt which disables the game until an operator clears the bill jam condition.

When a stacker is full, the game can displays a soft tilt error on the main screen. A "stacker full" may be displayed as a security measure. The stacker can be coupled to a bill acceptor and located in the main cabinet of a gaming machine (e.g., see bill acceptor 80 in FIG. 1A). The game can remain playable but will not accept any further currency or tickets. This tilt is automatically cleared once the stacker is emptied or replaced. When the stacker is removed, the game will be disabled and display a "STACKER OPEN" message. This tilt can be cleared when the stacker is reinserted.

The software validation software 222 can be executed by the CPU to validate the various software components on the gaming machine. For example, hashes of memory blocks can be performed and compared to stored hash values (e.g., stored in encrypted form in a secure encrypted database server). This software can differ from the validation logic which is executed separately by the BIOS to perform validation functions.

The metering software 222 can be used to update the hard meters and generate and update the soft meters. The metering software 222 can be configured to store metering information to the PHTM (e.g., see NVRAM 170 in FIG. 5). Examples of the meters which can be maintained are described above with respect to meters 138 in FIG. 5.

Figure 7:
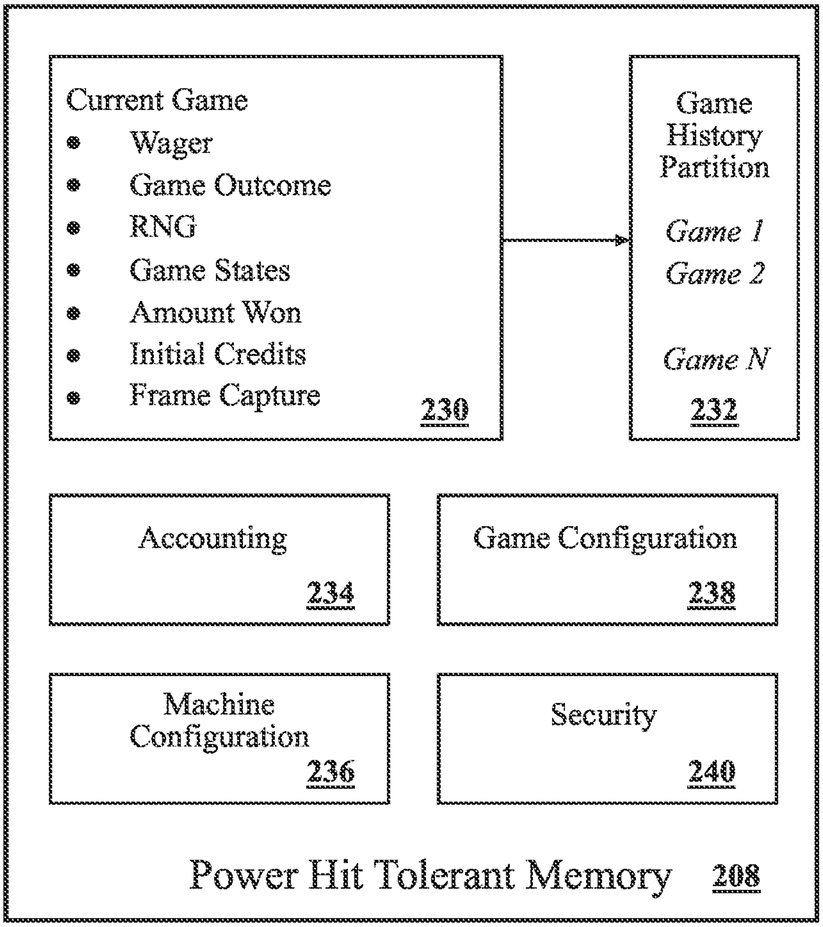
FIG. 7 illustrates a block diagram of power hit tolerant memory in accordance with the present disclosure.

FIG. 7 illustrates a block diagram of one embodiment of a power hit tolerant memory (PHTM) (Additional details of PHTMs are described with respect to NVRAM 170 in FIG. 5 and PHTM 202 in FIG. 6). Crucial information associated with the current game can be stored in 230. Some examples of crucial information include but are not limited to a wager amount, a game outcome, one or more random numbers to determine the game outcome, information about game states and sub-states including the current game state, an amount won, initial credits and frame captures associated with one or more states. As described above, this information can be used to return the game to a current state after a power-hit. The one or more random numbers can be used to regenerate a particular game outcome associated with the random numbers and the wager amount.

After a game is completed, it can be moved to a game history partition 232. The game history partition can store crucial data associated with a plurality of previously played games. For example, in one embodiment, the PHTM 202 can be configured to store crucial data associated with the current game and nine past games. In another embodiment, the PHTM 202 can store information associated with up to one hundred past games.

When the maximum number of games in the game history partition is reached, the software which manages the PHTM 202 can be configured to delete the oldest game. This process can occur prior to starting the next game. For example, if a maximum of ten games are stored in the game history 232, then prior to the play of the eleventh game, the oldest game can be cleared from the memory. In one embodiment, prior to the deletion of the crucial data associated with the oldest game, it can be copied to a secondary persistent memory.

In 234, accounting information can be stored. The accounting information can include the metering information previously described above. In some embodiments, this information can be recalled in the event of a power failure.

In 236, machine configuration information can be stored. Some example of machine configuration information can include but is not limited to Manufacturer ID, date of manufacturing, machine ID, operating system version, number of screens, cabinet type, hard disk capacity, PHTM capacity, number of PHTM banks, printer model information, touch screen model information, card reader model information, bill acceptor model information, display model information, jurisdiction information, casino name and other information, sales order #, manufacture information, logo's, etc. In one embodiment, the public key used in the code validation process can be stored here.

In game configuration 238, game configuration information can be stored. The game configuration information can include paytable selection, game features selections, bonus selections, jackpot contribution setting, denominations, max number of paylines, number of game titles and game versions. A gaming machine can have many paytables with different holding percentages which can be selected by the casino. Similarly, selectable game features and bonus features can be provided.

In security 240, security information can be stored. Security information can include information that lead to a tilt condition and the associated tilt condition. For example, if a door is opened, the security information can include when the door was opened, when game play was disabled, when the door was closed, when the tilt condition was cleared and when game play was subsequently enabled.

FIG. 8 illustrates a machine-implemented automated method M800 for responding to a power interruption on a gaming machine. In S802, the gaming machine can begin a power-up process 850. The power-up process can begin when a power switch in the interior of the gaming machine is turned on or when power is restored after a power interruption. In response to detecting external power is available, a signal can be generated which initiates a software integrity check on in S804.

In S804, the software integrity on the gaming machine can be checked. In particular embodiments, a public key/private key method and a "ladder of trust" can be used to verify control programs executed by the game controller. The initial rung of the ladder of trust can be the BIOS EPROM (see 162 in FIG. 5), which may be a conventional ROM device. This conventional ROM device can load and can verify the initial code which continues the "verify then load" ladder of trust until the entire operating system and the game is loaded. This process was described above in detail with respect to FIG. 5B.

In S806, the power-off security device (see 134 in FIG. 5 can be checked. The power-off security can monitor all the doors in the EGM. For example, the doors can use optical emitter/sensor pairs, but some might also use Hall-effect sensors. The system can be a standalone device with a CPU, RAM, NVRAM, sensors I/O board, and battery. The battery can be configured to last at least 30 days. It can be configured to record all critical events, such as power brown out, power black-out, main door open, logic (CPU) door open, bill acceptor door open, printer door open, top box door open and player tracking door open. These critical events may have occurred while the GMC was shut down and hence not monitoring the gaming machine for critical events.

In S808, the machine integrity can be checked. For example, the security sensors on the gaming machine can be checked to verify all the doors are closed. Further, gaming devices, such as the printer and the bill acceptor, can be checked to determine the devices are operating properly (e.g., see printer 78 and bill acceptor 80 in FIG. 1A).

In S810, critical memory on the gaming machine can be checked. For example, the PHTM can be checked to make sure the stored information matches associated hash values. As described, a hash value can be generated for crucial data stored in the PHTM. The hash values can be stored with the crucial data. When the PHTM integrity is checked, new hash values can be generated and compared to the stored hash values.

In S812, the GMC can determine whether all the checks were successful. If one or more of the checks are not successful, in S814, the gaming machine can enter a tilt state and game play on the gaming machine can be disabled. Information about the tilt state can be output to a display, such as the main display on which a gaming presentation for a wager-based game is output.

In S816, when all the checks are successful, event information associated with the successful power-up process can be stored to the PHTM. For example, the time that the gaming machine was enabled for game play can be stored to the PHTM. In one embodiment, as described above, this information can be used to generate a seed for a random number generator used on the gaming machine.

In S818, the gaming machine can enter game play mode. Thus, the gaming machine is enabled to accept bills and tickets that are redeemed for credits on the gaming machine. After credits are deposited, the gaming machine can be used to make wagers on the game(s) available for play on the gaming machine. In S820, the GMC can generate wager-based game play on the gaming machine and store crucial game play data to the PHTM.

Figure 9:
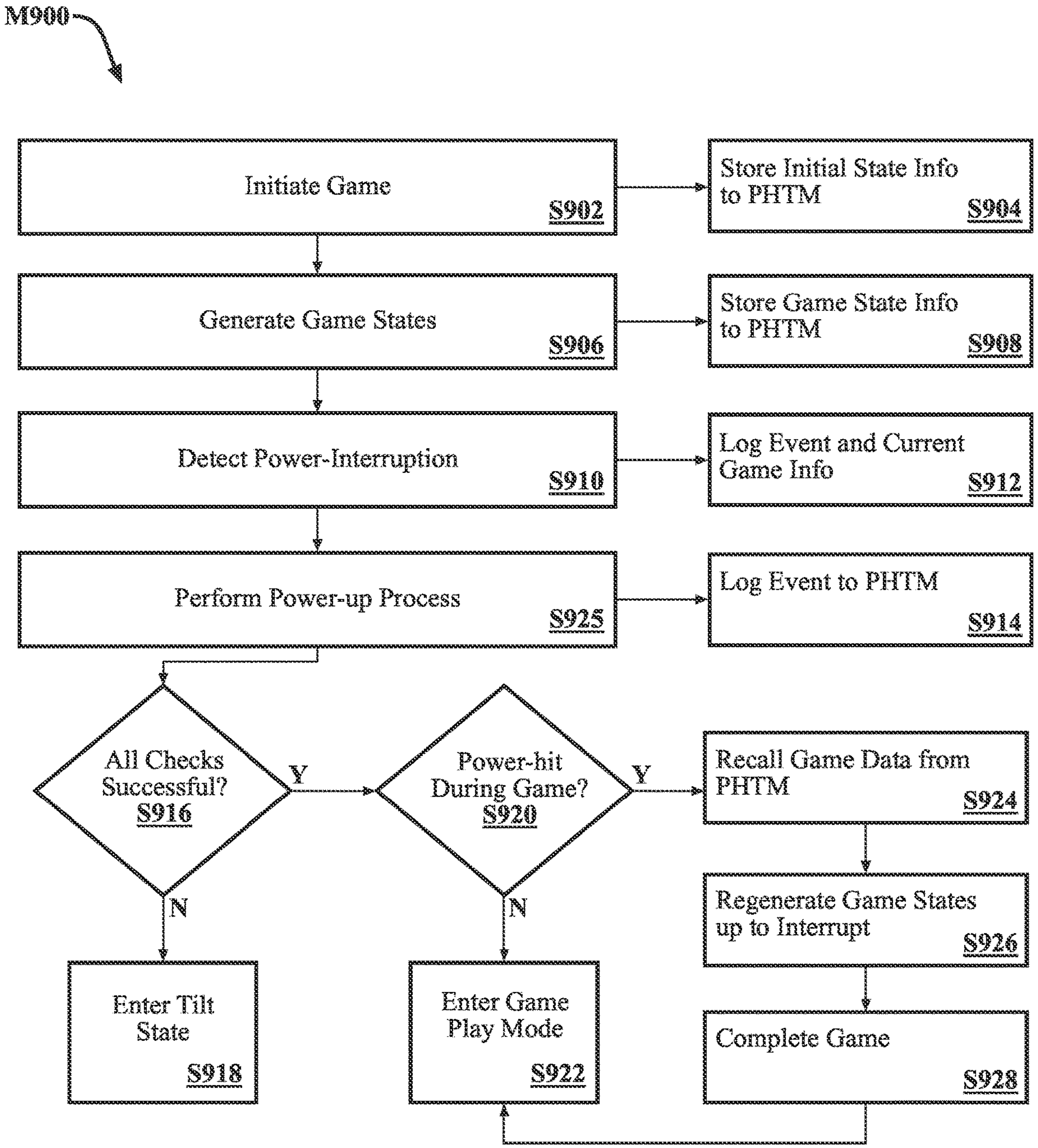
FIG. 9 illustrates a method powering up a gaming machine in accordance with the present disclosure.

FIG. 9 illustrates a method M900 powering up a gaming machine. In S902, a wager can be placed and a game can be initiated. In S904, initial state information associated with the game can be stored to the PHTM. In S906, game states associated with the game can be generated. In S908, crucial data associated with the game states can be stored to the PHTM.

In S910, a power-interruption can be detected. For example, the GMC can receive a signal from the power supply which indicates a power spike associated with a power shutdown has occurred. In S912, the event can be logged to the PHTM. In addition, current game state information can be logged to the PHTM prior to the power failure. After power is lost, the GMC may no longer operate unless an uninterruptable power supply is available.

In S925, the power-up process in FIG. 9 can be performed. In S914, this event can be logged to the PHTM. In S916, whether the power-up process is successful can be checked. In S918, if the check is not successful, the gaming machine can be placed in a tilt state and information about the tilt state can be output.

In S920, a check can be performed to determine whether the power-hit occurred during the play of a game and prior to completion of the game. This information can be stored in the PHTM. In S924, when the power-hit occurred during the play of a game, data associated with the game including the current game state can be retrieved from the PHTM. In S926, the game can be regenerated up to the current game state just prior to the power hit. In some embodiments, the gaming machine can be configured in the current game state without showing any information leading up to the current game state. In other embodiments, one or more game states prior to the current game state can be regenerated and output to the display.

In S928, the current game can be completed. In S922, the game can be enabled for game play. In S920, when the power-hit didn't occur during play of a game, the gaming machine can be powered-up and enabled for game play in S922.

Figure 10:
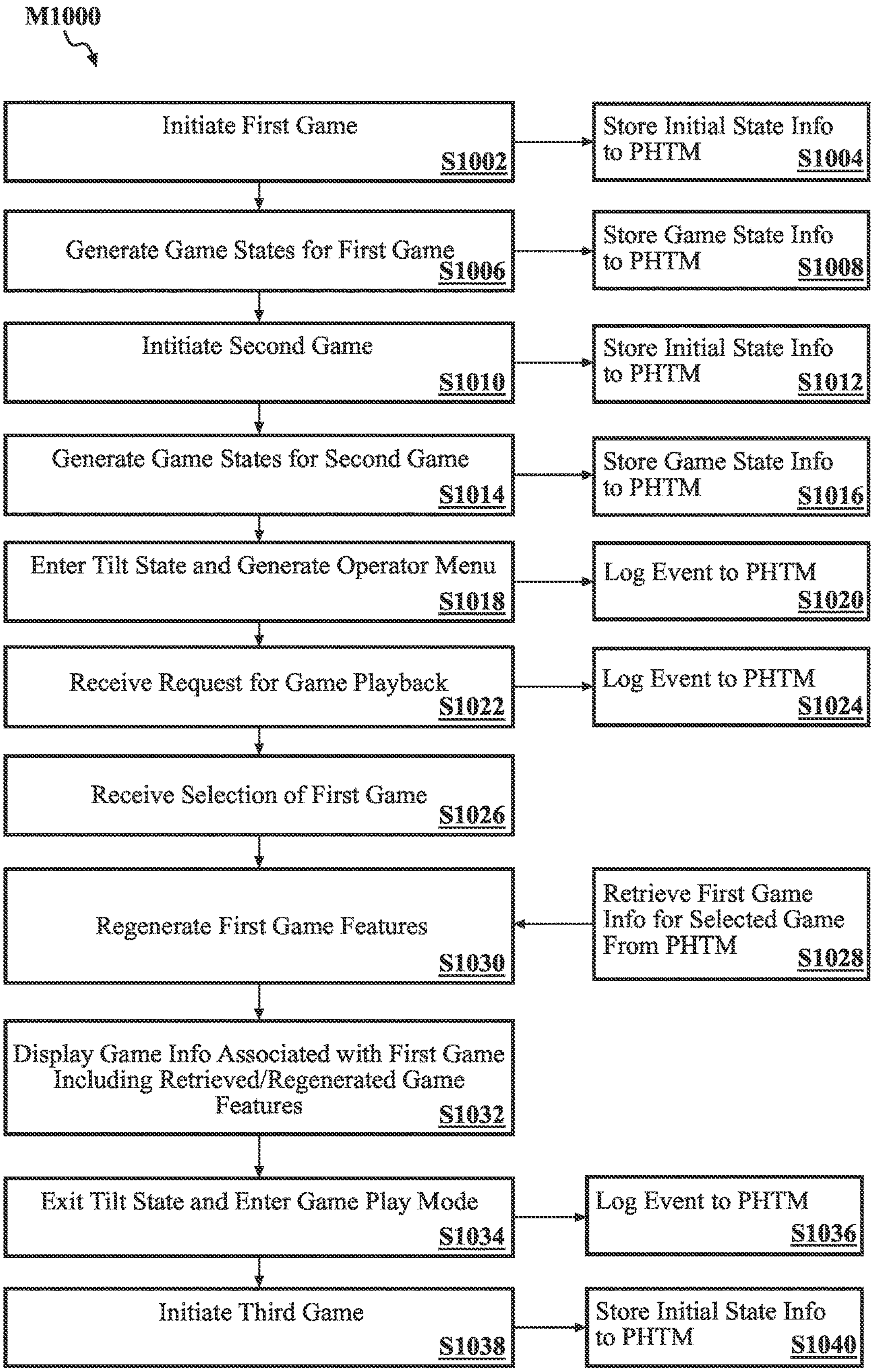
FIG. 10 illustrates a method playing back a game previously played on a gaming machine in accordance with the present disclosure.

FIG. 10 illustrates a method M1000 playing back a game previously played on a gaming machine. In S1002, a first game can be initiated on the gaming machine. In S1004, initial state information about the first game can be stored to the PHTM. In S1006, game states for the first game can be generated. In S1008, the game states can be stored to the PHTM. As described, in the event of a power-hit during play of the first game, the GMC (e.g., see GMC 24 in FIG. 5B) can be configured to restore the game and the gaming machine to a game state just prior to the power hit using information retrieved from the PHTM (e.g., see NVRAM 170 in FIG. 5B).

After the completion of the first game, in S1010, a second game can be initiated. The initial state information for the second game can be stored to the PHTM (e.g., sec NVRAM 170 in FIG. 5B). In S1014, the game states for the second game can be generated and the second can be brought to completion. In S1016, the game state information for the second game can be stored to the PHTM.

In S1018, the gaming machine can enter a tilt state. In one embodiment, the tilt state can be initiated in response to the operator inserting and turning a key in a locking mechanism on the outside of the gaming machine cabinet. Then, an operator menu can be generated and output to a display on the gaming machine. In S1020, the tilt state event can be logged in the PHTM.

In the S1022, the gaming machine using an input device, such as a touch screen, can receive a request for a game playback. The game playback can involve displaying information about a game previously played on the gaming machine. In S1024, this event can be logged to the PHTM. In S1026, a particular previously played game can be selected from among a plurality of games with game information stored in the PHTM. In this example, the first game played is selected.

In S1028, game information associated with the first game is retrieved from the PHTM. Some examples of game information which can be retrieved includes but are not limited one or more of random numbers used to generate the first game, screen shots, award information, bet information, credit information and screen shots from one or more game states.

In S1030, first game features can be regenerated. These game features can include animations of the play of the game, which represent one or more game states, or static images representing different game states. The animations of the play of the game can be regenerated using random numbers associated with the original play of the first game.

In S1032, game information associated with the first game, including the retrieved screen shots, regenerated static images and regenerated animations, can be output to a display on the gaming machine. In S1034, the gaming machine can exit the tilt state and enter game play mode. For example, to initiate this process an operator can turn a key in the locking mechanism and remove it from the locking mechanism.

In S1036, initiation of game play can be logged as an event to the PHTM. In S1038, a third game on the gaming machine can be initiated. In S1040, the initial state information associated with the third game can be stored to the PHTM.

Because such information and program instructions may be employed to implement the systems/methods described herein, the present disclosure relates to tangible (non-transitory) machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure. As used herein, the term "and/or" implies all possible combinations. In other words, A and/or B covers, A alone, B alone, and A and B together.

INDUSTRIAL APPLICABILITY

With reference to the drawings, and in operation, the present invention is related to a wager-based game, method, gaming machine and non-transitory computer-readable storage storing game software that provides a Mystery Bet feature to a player. This feature may be known as the "LuckyUP Bet" feature.

The LuckyUp Bet feature introduces an additional bet button on any game button panel that provides a new bet up experience for players. There are two utilizations: 1. A mystery bet multiplier and bet amount decided on the initiation of the spin or 2. A static bet amount with a mystery game multiplier. Both options give players an additional element of excitement and volatility and act as a mini-feature within the game.

Currently, players are somewhat stuck with the traditional bet level options and amounts. However, many players enjoy the idea of changing their bet each time because they feel it changes up the cadence of play. By having a mystery bet feature, players can change their bet on every spin with one press of a button or pressing repeat bet vs. changing their option every time.

The LuckyUp Bet feature introduces an additional bet button on any game button panel that provides a new bet up experience for players. There are two utilizations:

1. A mystery bet multiplier and bet amount decided on the initiation of the spin and
2. The second utilization of LuckyUp Bet introduces a static bet amount with a mystery game multiplier.

In the first utilization, a player can choose from any of the available bet options (1×, 2×, 3×, 5×, 10×) or they can utilize the LuckyUp Bet Mystery button. Once a player initiates a spin by pressing this button, they are charged one of the credit costs (75, 150, 225, 375 or 750) and given the associated bet multiplier (1×, 2×, 3×, 5× or 10×) for that spin. While currently players are stuck with the traditional bet level options and wagers, the LuckyUp Bet Mystery feature allows players to change the bet multiplier each time. Many players enjoy the idea of changing their bet each time because they feel it changes up the cadence of play. By having this mystery bet, players can change their bet on every spin with one press of a button or pressing repeat bet vs. manually changing their button press every time.

The second utilization of the LuckyUp Bet feature introduces a static bet amount with a mystery game multiplier.

Additionally, some players feel that a MAX BET Multiplier comes at too high of a price and is not achievable. These players would enjoy an option to get the MAX BET multiplier but pay less for it. It gives a sense that the player is getting a deal and makes MAX BET feel more achievable while also increasing average bet overall as players will be enticed to take the slightly more expensive option for the chance of getting a multiplier over their bet amount.

With respect to any material incorporated herein into by reference, it is to be understood that if there is conflict between the incorporated material and the present disclosure, the present disclosure controls. If there is conflict between two or more of the incorporated materials, the later dated one controls.

While the present disclosure has been particularly shown and described with reference to specific embodiments thereof, it will be understood by those skilled in the art that changes in the form and details of the disclosed embodiments may be made without departing from the spirit or scope of the present teachings. It is therefore intended that the disclosure be interpreted to include all variations and equivalents that fall within the true spirit and scope of the present teachings.

What is claimed is:

1. A gaming machine for providing a wager-based game to a player, comprising:

a cabinet having an interior;

a power supply, disposed within the interior of the cabinet, receiving power from an external power source;

memory, disposed within the interior of the cabinet, storing non-transitory game software used to generate the wager-based game on the gaming machine, a plurality of virtual reel strips, a paytable, and a set of winning paylines associated with the wager-based game, each virtual strip having a plurality of symbol positions, each symbol position having an associated symbol from a set of available symbols, the paytable including a payout amount associated with one or more of the symbols in the set of available symbols;

a display mounted in the cabinet and being electrically coupled to, and receiving power from the power supply, the display configured to display a play grid having a plurality of cells arranged in a plurality of columns, one of the virtual reel strips being associated with one of the columns;

a control panel establishing a user interface configured to allow the player to select a wager option from a set of available wager options, wherein the set of available options includes a plurality of bet level options having an associated wager and a mystery bet option; and, a gaming machine controller, including a processor, disposed within the interior of the cabinet and being coupled to the power supply, the display, and the memory, the gaming machine controller controlling play of a plurality of instances of the wager-based game, wherein for each instance of the wager-based game, the non-transitory game software controls the processor to:

establish a bet level and a wager amount as a function of the selected wager option, wherein the bet level is randomly established if the mystery bet option is selected by the user, wherein the bet level is a multiplier, randomly establish an outcome for the instance of the wager-based game, the outcome including a stop position associated with each virtual reel strip on the associated column resulting in a game symbol in each cell of the play grid, compare the outcome with the set of winning paylines and identify any winning paylines for the instance of the wager-based game, for each of the identified winning paylines: (1) establish an initial payout amount as a function of the symbol associated with the identified winning payline and the paytable (2) establish a payout amount as a function of the initial payout amount multiplied by the bet level, and, responsively provide an award to the player as a function of the outcome, the award being a sum of the payout amount(s) associated with the identified winning paylines.

2. The gaming machine, as set forth in claim 1, wherein the randomly established bet level is selected from the plurality of bet level options.

3. The gaming machine, as set forth in claim 2, wherein the plurality of bet level options includes a base bet level and multiples of the base bet level.

4. The gaming machine, as set forth in claim 3, wherein the base bet level and the multiples of the base bet level have an associated wager.

5. The gaming machine, as set forth in claim 4, wherein the wager amount associated with the mystery bet option is equal to the associated wager of the randomly established bet level.

6. The gaming machine, as set forth in claim 2, wherein each bet level option has an associated probability.

7. The gaming machine, as set forth in claim 6, wherein the associated probabilities are equal.

8. The gaming machine, as set forth in claim 7, wherein the associated probabilities are weighted, at least one probability is different from another one of the associated probabilities.

9. The gaming machine, as set forth in claim 1, wherein the wager amount associated with the mystery bet option is a predetermined amount.

10. The gaming machine, as set forth in claim 1, wherein the user interface includes a plurality of physical buttons.

11. The gaming machine, as set forth in claim 1, wherein the display includes a touchscreen display, and the user interface is implemented as virtual buttons on the touchscreen display.

12. A computer-based method of operating a gaming machine to providing a wager-based game to a player, the gaming machine includes a cabinet having an interior, a power supply, memory, a display, a control panel and a gaming machine controller, the power supply is disposed within the interior of the cabinet and receives power from an external power source, the memory is disposed within the interior of the cabinet and stores non-transitory game software used to generate the wager-based game on the gaming machine, a plurality of virtual reel strips, a paytable, and a set of winning paylines associated with the wager-based game, each virtual strip has a plurality of symbol positions, the paytable including a payout amount associated with one or more of the symbols in the set of available symbols, each symbol position has an associated symbol from a set of available symbols, the display is mounted in the cabinet and is electrically coupled to, and receives power from the power supply, the display is configured to display a play grid having a plurality of cells arranged in a plurality of columns, one of the virtual reel strips being associated with one of the columns, the control panel establishes a user interface, wherein the set of available options includes a plurality of bet level options having an associated wager and a mystery bet option, the gaming machine controller, including a processor, is disposed within the interior of the cabinet and is coupled to the power supply, the display, and the memory, the gaming machine controller controlling play of a plurality of instances of the wager-based game, wherein for each instance of the wager-based game, the non-transitory game software controls the processor to perform the steps:

presenting a set of available wager options to the player on the control panel, the set of available options includes a plurality of bet level options having an associated wager and a mystery bet option;

allow the player to select a wager option from the set of available wager options;

establishing a bet level and a wager amount as a function of the selected wager option, wherein the bet level is randomly established if the mystery bet option is selected by the user, wherein the bet level is a multiplier;

randomly establishing an outcome for the instance of the wager-based game, the outcome including a stop position associated with each virtual reel strip on the associated column resulting in a game symbol in each cell of the play grid, compare the outcome with the set of winning paylines and identify any winning paylines for the instance of the wager-based game, for each of the identified winning paylines: (1) establish an initial payout amount as a function of the symbol associated with the identified winning payline and the paytable (2) establish a payout amount as a function of the initial payout amount multiplied by the bet level, and, responsively provide an award to the player as a function of the outcome, the award being a sum of the payout amount(s) associated with the identified winning paylines.

13. The computer-based method, as set forth in claim 12, wherein the randomly established bet level is selected from the plurality of bet level options.

14. The computer-based method, as set forth in claim 13, wherein the plurality of bet level options includes a base bet level and multiples of the base bet level.

15. The computer-based method, as set forth in claim 14, wherein the base bet level and the multiples of the base bet level have an associated wager.

16. The computer-based method, as set forth in claim 15, wherein the wager amount associated with the mystery bet option is equal to the associated wager of the randomly established bet level.

17. The computer-based method, as set forth in claim 12, wherein each bet level option has an associated probability.

18. The computer-based method, as set forth in claim 17, wherein the associated probabilities are equal.

19. The computer-based method, as set forth in claim 18, wherein the associated probabilities are weighted, at least one probability is different from another one of the associated probabilities.

20. The computer-based method, as set forth in claim 12, wherein the wager amount associated with the mystery bet option is a predetermined amount.

21. Non-transitory computer-readable storage storing game software used to generate a wager-based game on a gaming machine, the gaming machine includes a cabinet having an interior, a power supply, memory, a display, a control panel and a gaming machine controller, the power supply is disposed within the interior of the cabinet and receives power from an external power source, the memory is disposed within the interior of the cabinet and stores non-transitory game software used to generate the wager-based game on the gaming machine, a plurality of virtual reel strips, a paytable, and a set of winning paylines associated with the wager-based game, the paytable including a payout amount associated with one or more of the symbols in the set of available symbols, each virtual strip has a plurality of symbol positions, each symbol position has an associated symbol from a set of available symbols, the display is mounted in the cabinet and is electrically coupled to, and receives power from the power supply, the display is configured to display a play grid having a plurality of cells arranged in a plurality of columns, one of the virtual reel strips being associated with one of the columns, the control panel establishes a user interface, wherein the set of available options includes a plurality of bet level options having an associated wager and a mystery bet option, the gaming machine controller, including a processor, is disposed within the interior of the cabinet and is coupled to the power supply, the display, and the memory, the gaming machine controller controlling play of a plurality of instances of the wager-based game, wherein for each instance of the wager-based game, the non-transitory game software controls the processor to:

present a set of available wager options to a player on the control panel, the set of available options includes a plurality of bet level options having an associated wager and a mystery bet option;

allow the player to select a wager option from the set of available wager options;

establish a bet level and a wager amount as a function of the selected wager option, wherein the bet level is randomly established if the mystery bet option is selected by the user, wherein the bet level is a multiplier;

randomly establish an outcome for the instance of the wager-based game, the outcome including a stop position associated with each virtual reel strip on the associated column resulting in a game symbol in each cell of the play grid, compare the outcome with the set of winning paylines and identify any winning paylines for the instance of the wager-based game, for each of the identified winning paylines: (1) establish an initial payout amount as a function of the symbol associated with the identified winning payline and the paytable and (2) establish a payout amount as a function of the initial payout amount multiplied by the bet level, and, responsively provide an award to the player as a function of the outcome, the award being a sum of the payout amount(s) associated with the identified the winning paylines.

* * * * *